United States Patent
Newbloom et al.

(10) Patent No.: US 10,525,417 B2
(45) Date of Patent: *Jan. 7, 2020

(54) NANOPOROUS CERAMIC MEMBRANES, MEMBRANE STRUCTURES, AND RELATED METHODS

(71) Applicant: University of Washington, Seattle, WA (US)

(72) Inventors: Gregory M. Newbloom, Seattle, WA (US); Aaron F. West, Seattle, WA (US); Ryan Kastilani, Seattle, WA (US); Canfeng Wei, Seattle, WA (US); Jaime Rodriguez, Seattle, WA (US); Lilo D. Pozzo, Seattle, WA (US); Lauren Martin, Seattle, WA (US)

(73) Assignee: University of Washington, Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/366,598

(22) Filed: Mar. 27, 2019

(65) Prior Publication Data

US 2019/0217252 A1 Jul. 18, 2019

Related U.S. Application Data

(63) Continuation of application No. PCT/US2019/012380, filed on Jan. 4, 2019.
(Continued)

(51) Int. Cl.
*B01D 67/00* (2006.01)
*B01D 71/02* (2006.01)
(Continued)

(52) U.S. Cl.
CPC ....... *B01D 67/0048* (2013.01); *B01D 71/024* (2013.01); *C04B 35/10* (2013.01);
(Continued)

(58) Field of Classification Search
None
See application file for complete search history.

(56) References Cited

U.S. PATENT DOCUMENTS

| | | |
|---|---|---|
| 2,483,868 A | 10/1949 | Archer et al. |
| 2,980,558 A | 4/1961 | Dempey et al. |

(Continued)

FOREIGN PATENT DOCUMENTS

| | | |
|---|---|---|
| CN | 1424138 A | 6/2003 |
| CN | 103752186 A | 4/2014 |
| WO | 2012/170541 A1 | 12/2012 |

OTHER PUBLICATIONS

Adiga, S.P., et al., "Nanoporous Membranes for Medical and Biological Applications," Wiley Interdisciplinary Reviews: Nanomedicine and Nanobiotechnology 1(5):568-581, Sep.-Oct. 2009.
(Continued)

*Primary Examiner* — Krishnan S Menon
(74) *Attorney, Agent, or Firm* — Christensen O'Connor Johnson Kindness PLLC

(57) ABSTRACT

Nanoporous selective sol-gel ceramic membranes, selective-membrane structures, and related methods are described. Representative ceramic selective membranes include ion-conductive membranes (e.g., proton-conducting membranes) and gas selective membranes. Representative uses for the membranes include incorporation into fuel cells and redox flow batteries (RFB) as ion-conducting membranes.

19 Claims, 20 Drawing Sheets

Related U.S. Application Data

(60) Provisional application No. 62/613,719, filed on Jan. 4, 2018, provisional application No. 62/613,712, filed on Jan. 4, 2018.

(51) Int. Cl.

| *C04B 35/624* | (2006.01) |
|---|---|
| *C04B 35/14* | (2006.01) |
| *C04B 35/10* | (2006.01) |
| *C04B 35/48* | (2006.01) |
| *B82Y 30/00* | (2011.01) |
| *H01M 8/18* | (2006.01) |

(52) U.S. Cl.
CPC .............. *C04B 35/14* (2013.01); *C04B 35/48* (2013.01); *C04B 35/624* (2013.01); *B01D 2323/22* (2013.01); *B01D 2325/02* (2013.01); *B01D 2325/26* (2013.01); *B82Y 30/00* (2013.01); *H01M 8/18* (2013.01)

(56) References Cited

U.S. PATENT DOCUMENTS

| 3,703,417 | A | | 11/1972 | Rosa et al. | |
|---|---|---|---|---|---|
| 3,843,341 | A | | 10/1974 | Hammel et al. | |
| 4,579,698 | A | | 4/1986 | Meyering et al. | |
| 4,645,519 | A | | 2/1987 | Fraioli et al. | |
| 5,139,540 | A | | 8/1992 | Najjar et al. | |
| 5,164,003 | A | | 11/1992 | Bosco et al. | |
| 5,435,958 | A | | 7/1995 | Dinnage et al. | |
| 5,652,020 | A | | 6/1997 | Collins et al. | |
| 5,772,735 | A | * | 6/1998 | Sehgal ................. | B01D 53/228 210/490 |
| 5,935,646 | A | * | 8/1999 | Raman ................. | B01D 53/228 427/216 |
| 6,447,943 | B1 | | 9/2002 | Peled et al. | |
| 6,475,656 | B1 | | 11/2002 | Koschany et al. | |
| 7,045,106 | B2 | | 5/2006 | Takahashi et al. | |
| 9,452,377 | B2 | | 9/2016 | Wu et al. | |
| 10,124,296 | B2 | * | 11/2018 | Pozzo ................ | B01D 67/0048 |
| 2002/0142172 | A1 | * | 10/2002 | Brinker ................. | B01D 53/22 428/446 |
| 2003/0012942 | A1 | * | 1/2003 | Larsen ................ | C04B 38/0045 428/304.4 |
| 2003/0049367 | A1 | | 3/2003 | Biegert et al. | |
| 2003/0211378 | A1 | | 11/2003 | Wald et al. | |
| 2004/0040416 | A1 | | 3/2004 | Erlebacher et al. | |
| 2004/0241522 | A1 | | 12/2004 | Ono et al. | |
| 2005/0035500 | A1 | | 2/2005 | Matsumoto et al. | |
| 2005/0079374 | A1 | | 4/2005 | Asai | |
| 2005/0100776 | A1 | | 5/2005 | Brunk et al. | |
| 2006/0040175 | A1 | | 2/2006 | Zuckerbrod et al. | |
| 2008/0210087 | A1 | * | 9/2008 | Ku ....................... | B01D 53/228 95/51 |
| 2008/0311390 | A1 | | 12/2008 | Seal et al. | |
| 2009/0090241 | A1 | | 4/2009 | Julbe et al. | |
| 2009/0209668 | A1 | | 8/2009 | Lee et al. | |
| 2009/0241496 | A1 | * | 10/2009 | Pintault .............. | B01D 67/0048 55/524 |
| 2009/0283480 | A1 | | 11/2009 | Schadler et al. | |
| 2009/0305026 | A1 | | 12/2009 | Wang et al. | |
| 2011/0081416 | A1 | | 4/2011 | Jammaer et al. | |
| 2011/0091761 | A1 | | 4/2011 | Miller et al. | |
| 2014/0012034 | A1 | | 1/2014 | Shaffer et al. | |
| 2014/0080039 | A1 | | 3/2014 | Easton et al. | |
| 2014/0335266 | A1 | | 11/2014 | Richet et al. | |
| 2015/0349369 | A1 | | 12/2015 | Li et al. | |
| 2018/0090777 | A1 | * | 3/2018 | Pozzo ................. | H01M 8/1016 |

OTHER PUBLICATIONS

Anderson, M.A., et al., "Titania and Alumina Ceramic Membranes," Journal of Membrane Science 39(3)243-258, Dec. 1988.

Benito, H.E., et al., "Synthesis and Physicochemical Characterization of Titanium Oxide and Sulfated Titanium Oxide Obtained by Thermal Hydrolysis of Titanium Tetrachloride," Brazilian Journal of Chemical Engineering 31(3):737-745, Jul.-Sep. 2014.

Brinker, C.J., and G.W. Scherer, "Sol-Gel Science: The Physics and Chemistry of Sol-Gel Processing," Academic Press, Inc., Boston, 1990, 462 pages.

Brinker, C.J., et al., "Sol-Gel Strategies for Controlled Porosity Inorganic Materials," Journal of Membrane Science 94(1):85-102, Sep. 1994.

Bulter, P., et al., "SasView Documentation, Release 4.2.1: The SasView Project," SasView for Small Angle Scattering Analysis, Feb. 10, 2019, <https://www.sasview.org/>, 593 pages.

Chen, H., et al., "Recent Progress in Organic Redox Flow Batteries: Active Materials, Electrolytes and Membranes," Journal of Energy Chemistry 27(5):1304-1325, Sep. 2018.

Ecsedi, Z., "Synthesis of Tailored Porosity Materials Using the Sol-Gel Method," Chem. Bull. "Politehnica" Univ. (Timişoara), 52(66):1-2, 2007.

Fan, L., et al., "The Absolute Calibration of a Small-Angle Scattering Instrument With a Laboratory X-Ray Source," from the XIV International Conference on Small-Angle Scattering (SAS09), Journal of Physics: Conference Series 247:012005, 2010, 11 pages.

Hench, L.L., and J.K. West, "The Sol-Gel Process," Chemical Reviews 90(1):33-72, Jan. 1990.

Hilal, N., et al., "A Comprehensive Review of Nanofiltration Membranes: Treatment, Pretreatment, Modelling and Atomic Force Microscopy," Desalination 170(3):281-308, Nov. 2004.

Janoschka, T., et al., "An Aqueous, Polymer-Based Redox-Flow Battery Using Noncorrosive, Safe, and Low-Cost Materials," Nature 527(7576):78-81, Nov. 2015.

JEFCA (The Joint FAO/WHO Expert Committee on Food Additives), "Titanium Dioxide," FAO JECFA Monographs 13 prepared at the 76th JECFA, vol. 13, pp. 31-35, 2012.

Kappert, E.J., et al., "Expeditious Calcination of Inorganic Membranes by an Instant Temperature Increment," Micro and Mesoporous Materials 151:211-215, Mar. 2012.

Kim, J., and B. Van der Bruggen, B., "The Use of Nanoparticles in Polymeric and Ceramic Membrane Structures: Review of Manufacturing Procedures and Performance Improvement for Water Treatment," Environmental Pollution 158(7):2335-2349, Jul. 2010.

Kline, S.R., "Reduction and Analysis of SANS and USANS Data Using IGOR Pro," Journal of Applied Crystallography 39(6):895-900, Nov. 2006.

Kozuka, H., et al. "Stress and Cracks in Gel-Derived Ceramic Coatings and Thick Film Formation," Journal of Sol-Gel Science and Technology 26(1-3):681-686, Jan. 2003.

Nawrocki, J.R., et al., "Part II. Chromatography Using Ultra-Stable Metal Oxide-Based Stationary Phases for HPLC," Journal of Chromatography A 1028(1):31-62, Feb. 2004.

Rezgui, S., and B.C. Gates, "Sol-Gel Synthesis of Alumina in the Presence of Acetic Acid: Distinguishing Gels and Gelatinous Precipitates by NMR Spectroscopy," Chemical Materials 6(12):2386-2389, Dec. 1994.

Schäfer, C., et al., "A Polymer Based and Template-Directed Approach Towards Functional Multidimensional Micro-Structured Organic/Inorganic Hybrid Materials," Journal of Materials Chemistry C 2(37):7960-7975, Oct. 2014.

Schmidt, H., "Chemistry of Material Preparation by the Sol-Gel Process," Journal of Non-Crystalline Solids 100(1-3):51-64, Mar. 1988.

Schnablegger, H., and Y. Singh, "The SAXS Guide," 3d ed., Anton Paar GmbH, Graz, Austria, Jun. 2013, 124 pages.

Schwenzer, B., et al., "Membrane Development for Vanadium Redox Flow Batteries,"ChemSusChem 4 (10):1388-1406, Oct. 2011.

Sondhi, R., et al., "Applications and Benefits of Ceramic Membranes," Membrane Technology 11:5-8, Nov. 2003.

Swette, L., and V. Jalan, "Development of Electrodes for the NASA Iron/Chromium Redox System and Factors Affecting Their Performance," prepared for NASA and U.S. Department of Energy, DOE/NASA/0262-1, NASA CR-174724, Jun. 1984, 284 pages.

Teixeira, J., "Small-Angle Scattering by Fractal Systems," Journal of Applied Crystallography 21(6):781-785, Dec. 1988.

(56) References Cited

OTHER PUBLICATIONS

U.S. Department of Energy, "Advanced Materials and Devices for Stationary Electrical Energy Storage Applications," Dec. 2010, 52 pages.
Viswanathan, V., et al., "Cost and Performance Model for Redox Flow Batteries," Journal of Power Sources 247:1040-1051, Feb. 2014.
Wadia, C., et al., "Resource Constraints on the Battery Energy Storage Potential for Grid and Transportation Applications," Journal of Power Sources 196(3):1593-1598, Feb. 2011.
Wang, W., et al., "Recent Progress in Redox Flow Battery Research and Development," Advanced Functional Materials 23(8):970-986, Feb. 2013.
Weber, A., et al., "Redox Flow Batteries: A Review," Journal of Applied Electrochemistry 41(10):1137-1164, Oct. 2011.
Wei, C., "Making Ceramic Membranes Used in Redox Flow Batteries With Sol-Gel Process," Master's Thesis, University of Washington, Seattle, Jul. 31, 2018, 47 pages.
Xi, J., et al., "Nafion/SiO$_2$ Hybrid Membrane for Vanadium Redox Flow Battery," Journal of Power Sources 166(2):531-536, Apr. 2007.
Zhang, M., et al., "Capital Cost Sensitivity Analysis of an All-Vanadium Redox-Flow Battery," Journal of the Electrochemical Society 159(8):A1183-A1188, 2012.
Carroll, N.J., et al., "Microfluidic Synthesis of Monodisperse Nanoporous Oxide Particles and Control of Hierarchical Pore Structure," ACS Applied Materials & Interfaces 5(9):3524-3529, May 2013.
Choi, S., et al., "Fabrication and Gas Separation Properties of Polybenzimidazole (PBI)/Nanoporous Silicates Hybrid Membranes," Journal of Membrane Science 316(1-2):145-152, May 2008.
Dunn, B., et al., "Electrical Energy Storage for the Grid: A Battery of Choices," Science 334(6058):928-935, Nov. 2011.
Fricke, J., and T. Tillotson, "Aerogels: Production, Characterization, and Applications," Thin Solid Films 297(1-2):212-223, Apr. 1997.
Gao, G.-M., et al., "Preparation of Silica Aerogel From Oil Shale Ash by Fluidized Bed Drying," Powder Technology 197(3):283-287, Jan. 2010.
Gold, S., et al., "Acid Loaded Porous Silicon as a Proton Exchange Membrane for Micro-Fuel Cells," Journal of Power Sources 135(1-2):198-203, Sep. 2004.
He, J., et al., "Preparation of Porous and Nonporous Silica Nanofilms from Aqueous Sodium Silicate," Chemistry of Materials 15(17):3308-3313, Aug. 2003.
International Preliminary Report on Patentability dated Aug. 16, 2018, issued in corresponding International Application No. PCT/US2017/016246, filed Feb. 2, 2017, 13 pages.
International Search Report and Written Opinion dated Sep. 26, 2017, issued in corresponding International Application No. PCT/US2017/16246, filed Feb. 2, 2017, 15 pages.
Jiang, F., et al., "Fast Proton-Conducting Glass Membrane Based on Porous Phosphosilicate and Perfluorosulfonic Acid Polymer," Journal of Power Sources 196(3):1048-1054, Feb. 2011.
Jin, Y.G., et al., "Phosphonic Acid Functionalized Silicas for Intermediate Temperature Proton Conduction," Journal of Materials Chemistry 19(16):2363-2372, Apr. 2009.
Kazemimoghadam, M., "New Nanopore Zeolite Membranes for Water Treatment," Desalination 251(1-3):176-180, Feb. 2010.
Klichko, Y., "Mesostructured Silica for Optical Functionality, Nanomachines, and Drug Delivery," Journal of the American Ceramic Society 92(s1):s2-s10, Jan. 2009.
Lee, J.-S., et al., "Synthesis of Mesoporous Silicas of Controlled Pore Wall Thickness and Their Replication to Ordered Nanoporous Carbons With Various Pore Diameters," Journal of the American Chemical Society 124(7):1156-1157, Feb. 2002.
Lin, H.-P., and C.-P. Tsai, "Synthesis of Mesoporous Silica Nanoparticles From a Low-Concentration CnTMAX—Sodium Silicate Components," Chemistry Letters 32(12)1092-1093, Dec. 2003.

Liu, X., and J. He, "One-Step Hydrothermal Creation of Hierarchical Microstructures Toward Superhydrophilic and Superhydrophobic Surfaces," Langmuir 25(19)11822-11826, Oct. 2009.
Moghaddam, S., et al., "An Inorganic-Organic Proton Exchange Membrane for Fuel Cells With a Controlled Nanoscale Pore Structure," Nature Nanotechnology 5(3):230-236, Mar. 2010.
Munoz-Aguado, "Sol-Gel Synthesis of Microporous Amorphous Silica From Purely Inorganic Precursors," Journal of Colloid and Interface Science 185:459-465, 1997.
Newalkar, B.L., and S. Komarneni, "Synthesis and Characterization of Microporous Silica Prepared With Sodium Silicate and Organosilane Compounds," Journal of Sol-Gel Science and Technology 18(3):191-198, Aug. 2000.
Parasuraman, A., et al., "Review of Material Research and Development for Vanadium Redox Flow Battery Applications," Electrochimica Acta 101:27-40, Jul. 2013.
Pramer, D., "The Influence of Physical and Chemical Factors on the Preparation of Silica Gel Media," Applied Microbiology 5(6):392-395, Nov. 1957.
Prifti, H., et al., "Membranes for Redox Flow Battery Applications," Membranes 2(2):275-306, Jun. 2012.
Ray, R.C., and P.B. Ganguly, "The Optimum Conditions for the Formation of Silica Gel From Alkali Silicate Solutions," Journal of Physical Chemistry 34(2):352-358, 1930.
Selvam, P., et al., "Recent Advances in Processing and Characterization of Periodic Mesoporous MCM-41 Silicate Molecular Sieves," Industrial & Engineering Chemistry Research 40(15):3237-3261, Jul. 2001.
Shen, C.-H., et al., "Sodium Silicate/Graphite Conductive Composite Bipolar Plates for Proton Exchange Membrane Fuel Cells," Journal of Power Sources 162(1):460-463, Nov. 2006.
Sinkó, K, "Influence of Chemical Conditions on the Nanoporous Structure of Silicate Aerogels," Materials 3(1):704-740, Jan. 2010.
Tognonvi, M.T., et al., "Physical-Chemistry of Sodium Silicate Gelation in an Alkaline Medium," Journal of Sol-Gel Science and Technology 58(3):625-635, Jun. 2011.
Toh, G.M., et al., "Sodium Silicate Based Sol-Gel Structures for Generating Pressure-Driven Flow in Microfluidic Channels," Journal of Chromatograpy A 1217(30):5004-5011, Jul. 2010.
Tompsett, G.A., et al., "Microwave Synthesis of Nanoporous Materials," ChemPhysChem 7(2):296-319, Feb. 2006.
"Vanadium Redox (VRB) Flow Batteries," Energy Storage Association, <http://energystorage.org/energy-storage/technologies/vanadium-redox-vrb-flow-batteries> [retrieved Feb. 9, 2016], 3 pages.
Viswanathan, V., et al., "Estimation of Capital and Levelized Cost for Redox Flow Batteries," U.S. Department of Energy (USDOE-OE ESS), Peer Review at Washington, DC, Sep. 28, 2012, 16 pages.
Wang, R., et al., "Highly Ordered Supermicroporous Silica," Journal of Physical Chemistry 111(29):10955-10958, 2007.
Yachi, A., et al., "Silica Gel With Continuous Macropores Prepared From Water Glass in the Presence of Poly(Acrylic Acid)," Journal of Non-Crystalline Solids 351(4):331-339, Feb. 2005.
Zhang, L., et al., "Drying and Nondrying Layer-by-Layer Assembly for the Fabrication of Sodium Silicate/TiO$_2$ Nanoparticle Composite Films," Langmuir 28(3):1816-1823, Jan. 2012.
Amundaraín Hurtado, J.L., "Characterization of Athabasca Asphaltenes Separated Physically and Chemically Using Small-Angle X-Ray Scattering," Master's Thesis, University of Alberta, 2010, 42 pages.
Cherny, A.Y., et al., "Small-Angle Scattering From Multi-Phase Fractals," Journal of Applied Crystallography 47(1), Feb. 2014, 9 pages.
Dos Santos, L.R.B., et al., "Sol Phase and Sol-Gel Transition in SnO$_2$ Colloidal Suspensions," Journal of Applied Crystals 33(3-1):609-613, Jun. 2000.
Glabman, S.M., "Effect of Inorganic Filler Size on Nanocomposite Ion Exchange Membranes for Salinity Gradient Power Generation," Master's Thesis, Georgia Institute of Technology, Dec. 2014, 21 pages.
International Search Report and Written Opinion dated May 31, 2019, issued in corresponding International Application No. PCT/US2019/12380, filed Jan. 4, 2019, 17 pages.

(56) References Cited

OTHER PUBLICATIONS

Justice, R.S., "Small-Angle Scattering From Nanocomposites: Elucidation of Hierarchical Morphology/Property Relationships," Doctoral Dissertation, University of Cincinnati, Oct. 2007, 25 pages.
Kotlarchyk, M., et al., "Study of Schultz Distribution to Model Polydispersity of Microemulsion Droplets," Journal of Physical Chemistry 92:1533-1538, 1988.
Mang, J.T., and R.P. Hjelm, "Fractal Networks of Inter-Granular Voids in Pressed TATB," Propellants, Explosives, Pyrotechnics 38(6):831-840, Dec. 2013.
Owens, G.J., et al., "Sol-Gel Based Materials for Biomedical Applications," Progress in Materials Science 77:1-79, 2016.
Teixeira, J., "Small Angle Scattering by Fractal Systems," Journal of Applied Crystallography 21(6), Dec. 1988, 17 pages.

\* cited by examiner

| RADIUS: 4.8 POROSITY: 2.6% | RADIUS: 4.5 POROSITY: 2.8% | RADIUS: 4.4 POROSITY: 2.8% |
|---|---|---|
| RADIUS: 4.6 POROSITY: 2.8% | RADIUS: 4.7 POROSITY: 2.6% | RADIUS: 4.5 POROSITY: 2.9% |
| RADIUS: 4.5 POROSITY: 3.4% | RADIUS: 4.5 POROSITY: 2.7% | RADIUS: 4.5 POROSITY: 2.6% |

*FIG. 19C*

NANOPOROUS CERAMIC MEMBRANES, MEMBRANE STRUCTURES, AND RELATED METHODS

CROSS-REFERENCES TO RELATED APPLICATIONS

This application is a continuation of International Application No. PCT/US2019/012380, filed Jan. 4, 2019, which claims the benefit of U.S. Provisional Application No 62/613,719, filed Jan. 4, 2018, and U.S. Provisional Application No 62/613,712, filed Jan. 4, 2018, the disclosures of which are expressly incorporated herein by reference in their entirety.

BACKGROUND

Nanoporous ceramic membranes capable of selectively filtering molecules offer numerous advantages over their polymeric counterparts, including enhanced chemical stability and lower fouling. High-temperature sintering and calcination of ceramic membranes are used to improve durability and reduce grain boundaries; otherwise ceramic membranes break under the compression required to create air- and liquid-tight seals. Unfortunately, these high-temperature processing steps dramatically increase the cost of the membrane to the point they often cannot be implemented commercially.

The ability to create ceramic selective membranes can be of especially significant benefit to redox flow batteries (RFB). RFBs provide a promising solution to grid-scale energy storage needs. Unlike conventional solid-state batteries, the electrolytes in RFBs are stored in external tanks and are pumped through the cell stack of the battery. Thus, the RFB possesses several attractive qualities, such as ease of scalability, long service life, and the separation of power and energy. Unfortunately, the current high cost of RFBs has hindered their ability to be widely commercialized. The membrane contributes significantly to this high cost, where it can account for up to 40% of the total capital cost. In these applications, membranes must be able to transport charge balancing ions and prevent the crossover of active species. The poor ion selectivity of commercial membranes has led to an emphasis on the all-vanadium RFB (VRFB), which can mitigate the detrimental effect of crossover due to its symmetric electrolyte composition. Instead of a permanent loss of capacity, crossover only leads to a loss of efficiency in VRFBs. However, vanadium is expensive and can result in as much as 50% of the total capital costs of an RFB. The U.S. Department of Energy has listed a target cost of $100/kWh for RFBs, yet VRFBs have an estimated capital cost of $447/kWh.

As the first true RFB, the Iron-Chromium redox flow battery (ICRFB) is very attractive in terms of its cost effectiveness, comprising cheap and abundant active materials. It has a standard overall cell potential of 1.18 V with the reactions occurring within the battery are listed below.

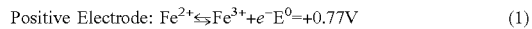

Positive Electrode: $Fe^{2+} \leftrightarrows Fe^{3+} + e^-\ E^0 = +0.77V$      (1)

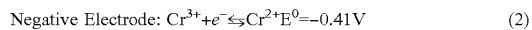

Negative Electrode: $Cr^{3+} + e^- \leftrightarrows Cr^{2+}\ E^0 = -0.41V$      (2)

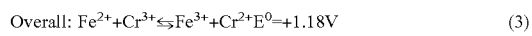

Overall: $Fe^{2+} + Cr^{3+} \leftrightarrows Fe^{3+} + Cr^{2+}\ E^0 = +1.18V$      (3)

Despite the cost effectiveness of the ICRFB, it is prone to significant membrane crossover of the active species that results in irreversible capacity decay. This same capacity occurs for many other inexpensive RFB chemistries and has largely prevented their commercialization.

There is still a need for a selective sol-gel membrane that can reduce flow battery costs and enable new flow battery chemistries.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

In one aspect, the present disclosure provides a nanoporous selective sol-gel ceramic membrane, generally including a porous support having a plurality of support pores that are 10 nm or greater in diameter; and a nanoporous composite comprising a nanoporous sol-gel ceramic composite filling at least a portion of the porous support; wherein the nanoporous composite comprises a plurality of nanopores of 5 nm or smaller in radius with a polydispersity index of 0.5 or lower.

In another aspect, the present disclosure provides a nanoporous selective sol-gel ceramic membrane, generally including a porous support having a plurality of support pores that are 10 nm or greater in diameter; and a nanoporous composite comprising a nanoporous sol-gel ceramic composite filling at least a portion of an active area of the porous support; wherein the nanoporous sol-gel ceramic has a fractal nanoporous structure as determined by fitting small-angle scattering spectra of the nanoporous sol-gel ceramic to a mathematical model.

In yet another aspect, the present disclosure provides a selective-membrane structure generally including a plurality of individual selective membranes joined in a planar configuration.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein:

FIGS. 19A-19C are SEM images of the top (FIG. 19A) and cross-section (FIG. 19B) of nine areas in 1:5 PSS:TEOS molar ratio membrane, superimposed on the imaged area. FIG. 19C show superimposed pore radii and porosities from SAXS modeling over their sampled areas.

DETAILED DESCRIPTION

Figure 1:
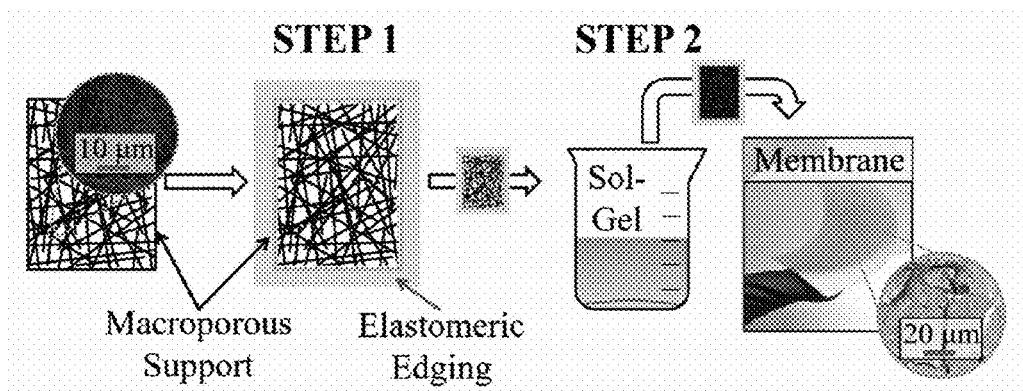
FIG. 1 illustrates a method, in accordance with an embodiment of the disclosure, for preparing an exemplary nanoporous selective sol-gel ceramic composite membrane. Step 1: Apply edging to support. Step 2: Sol-gel coating from precursor solution.

Disclosed herein are nanoporous selective sol-gel ceramic composite membranes, selective-membrane structures, and a method of making the nanoporous selective sol-gel ceramic composite membranes by forming a selective ceramic on a porous membrane support. Representative nanoporous selective sol-gel ceramic composite membranes include ion-conductive membranes (e.g., proton-conducting membranes) and gas selective membranes. Representative uses for the membranes of the present disclosure include incorporation into fuel cells and redox flow batteries (RFB) as ion-conducting membranes.

Nanoporous Selective Sol-Gel Ceramic Composite Membranes

In one aspect, disclosed herein is a nanoporous selective sol-gel ceramic membrane, comprising a porous support having a plurality of support pores that are 10 nm or greater in diameter and a nanoporous composite comprising a nanoporous sol-gel ceramic composite filling at least a portion of the porous support; wherein the nanoporous composite comprises a plurality of nanopores of about 5 nm or smaller in radius with a polydispersity index of about 0.5 or lower.

The nanoporous selective sol-gel ceramic membranes can be formed without high-temperature processing of the ceramic. The structure is accomplished, for example, by lining the edge of a porous support with a compressible polymer (e.g., FIG. 1) and filling in the porous support with a sol-gel ceramic composite. This approach enables the membrane active area to be mechanically decoupled from the compression region, thus providing a route to use non-sintered and non-calcinated sol-gel ceramic containing membranes in filtration and separation processes.

In addition to RFBs, membranes, filters, or separators prepared using the method disclosed here can be used in applications such as: fuel cells, lithium ion batteries, other battery chemistries, electro-dialysis, cross-flow filtration, dead-end filtration, pharmaceutic purifications, waste water treatment, reverse osmosis water purification, food processing, textiles, and others. It should be noted that it is possible to build nanoporous ceramic composite membranes utilizing other sol-gel methodologies with key differences.

Typically, the membranes described comprise three components that serve distinct purposes: a macroporous support, a nanoporous composite layer, and a polymeric edge. The macroporous support structure is capable of wetting a solvent based ceramic dispersion/solution (e.g., siloxane) in order to create a nanoporous (i.e., <10 nm) ceramic structure. The nanoporous composite layer is within the macroporous support structure with characteristic porosity of <10 nm. The compressible polymer edge, when present, eliminates or reduces compressive forces on the nanoporous sol-gel selective ceramic layer while enabling liquid-tight sealing at the edges. In certain circumstances, the porous support structures can also contain a pre-coating (i.e., prior to the nanoporous sol-gel) to improve mechanical, chemical or electro-chemical stability. In other circumstances, membranes can undergo a post treatment chemical bath to further induce gelation.

Porous Membrane Supports

The porous membrane support (sometimes referred to herein simply as the "porous support" or "support") is the structural foundation within and/or upon which the nanoporous selective sol-gel ceramic is formed. The support provides mechanical strength and a porous structure. Typically, the porous substrates comprise support pores with an average support pore radius between about 10 nm and about 50 μm. In some embodiments, the support pores have an average radius of about 10 nm or greater. When the ceramic is formed on the support, the relatively large pores of the support are closed and filled with the ceramic until nanometer- or angstrom-sized pores remain in the final membrane.

Any suitable organic or inorganic material can be used as a porous support. In some embodiments, the porous support comprises a material selected from the group consisting of a polymeric material, a ceramic material, a metal, and a combination thereof. The porous substrate can comprise a nonwoven fabric, a nonwoven mesh, a veil, a knit fabric, a woven fabric, a woven mesh, an open-cell foam, and combinations thereof. In some embodiments, the porous membrane support has a chemical surface functionality that is chemically similar to the ceramic precursor sol used to form the membrane; for example, a silica mesh can be used as a support for forming a silica-based sol-gel ceramic membrane of the disclosure. In other embodiments, the porous membrane support is chemically different from the ceramic precursor sol used to form the membrane. For instance, a silica sol can be used to form an exemplary membrane by filling at least a portion of a polymeric or metal membrane.

In some embodiments, the porous support comprises a material selected from the group consisting of polypropylene, polyethylene, polyvinyl chloride, polystyrene, polyamide, polyimide, polyacetonitrile, polyvinylacetate, polyethylene glycol, poly ether ketone, polysulfone, polysulfonamide, polyacrylamide, polydimethylsiloxane, polyvinylidene fluoride, polyacrylic acid, polyvinyl alcohol, polyphenylene sulfide, polytetrafluoroethylene, cellulose, and combinations thereof. In one embodiment, the porous support is selected from the group consisting of silica filter paper, polyvinylidene fluoride (PVDF), polyether ether ketone (PEEK), and polytetrafluoroethylene (PTFE). In certain embodiments, the porous support comprises silica, titania, germania, zirconia, alumina, graphite, silicon carbide, silicon nitride, boron nitride, borosilicate glass, lithium silicate, potassium silicate, tin oxide, iron oxide, carbon nanotubes, iron, or a combination thereof.

Compressible Edging or Gasket

In some embodiments, the membranes disclosed herein comprise a compressible edging or gasket. Compressible edging enables membranes, in certain embodiments, to be incorporated into batteries, fuel cells, or other systems where a gasket sealing the membrane is used. The compressible edging is both mechanically compressible and also resistant to the heat and/or harsh chemical environments in which the membranes are utilized.

Accordingly, in some embodiments, the nanoporous selective sol-gel ceramic membranes disclosed herein further comprise a compressible edging along at least a portion of an edge of the porous support formed by a polymeric material. In some embodiments, the polymeric material infiltrates the porous support by at least 1 um.

In some embodiments, the compressible edging is formed along all edges of the porous support, defining a gasket. In other embodiments, the compressible edging is formed along at least a portion of at least one edge of the porous support. In some embodiments, the compressible edging covers about 50% or less, about 25% or less, about 10% or less, or about 5% or less of a surface of the nanoporous selective sol-gel ceramic membrane disclosed herein. In some embodiments, the edge portion is 1 mm or greater in width. In some embodiments, the edge portion is 5 mm or greater in width. In other embodiments, the edge portion is 1 cm or greater in width.

The compressible edging can be formed using any suitable method, prior to or after filling the porous membrane support with the precursor sol and gelling the precursor sol. In one embodiment, a compressible edging is formed after formation of the ceramic selective membrane (i.e., after the sol-gel process). In one embodiment, the method includes the step of impregnating the edge portion of the porous membrane substrate with a polymeric material, for example, impregnating one or more or all edges of the porous membrane substrate with a compressible polymer, sufficient to form a gasket bordering the porous membrane substrate.

In further embodiments, the compressible edging is formed using ultrasonic welding or hot pressing. In certain embodiments, impregnating the edge portion of the porous membrane substrate with the compressible polymer comprises a method selected from the group consisting of melting, solution deposition, and in situ reaction.

In some embodiments, the polymeric material comprises an elastomeric polymer, such as a thermoplastic elastomeric polymer. Any suitable elastomeric polymer can be used to form the compressible edging of the membranes disclosed herein, for example, suitable materials include styrene isobutylene butadiene polymers, UV- or heat-curable silicones, and epoxies. In some embodiments, the polymer is selected from the group consisting of poly(styrene-isobutylene-styrene) (SIBS), polyvinylidene fluoride (PVDF), and polydimethylsiloxane (PDMS).

Sol-Gel Precursors

In some embodiments, the nanoporous selective sol-gel ceramic membranes are prepared by coating the porous support with a sol-gel precursor composition comprising one or more ceramic precursors and gelling the sol-gel precursor composition to form nanoporous sol-gel ceramic composite within the porous support.

Suitable ceramic precursors include silica, siloxane, silicate ester, silanol, silane, ormosil, titania, zirconia, germania, alumina, graphite, silicon carbide, silicon nitride, boron nitride, and combinations thereof. In some embodiments, the ceramic precursor comprises tetraalkyl orthosilicates, silanols, silanes, halosilanes, and combinations thereof.

Typically, the ceramic precursors include small molecules (i.e., <2 nm radius) and generally account for about 20 volume % or more of a sol-gel precursor composition. In some embodiments, the ceramic precursors account for about 40 volume % or more of a sol-gel precursor composition. In some embodiments, the ceramic precursors account for about 60 volume % or more of a sol-gel precursor composition.

In some embodiments, the ceramic precursor comprises tetraalkyl orthosilicate of formula $Si(OR)_4$, wherein R is an optionally substituted C1-C15 alkyl. In some embodiments, the tetraalkyl orthosilicate is tetraethyl orthosilicate (TEOS). Preparations of some exemplary membrane using a ceramic precursor comprising TEOS are described in the Examples below.

In some embodiments, the ceramic precursor comprises one or more organosilanes of the formula $R^*_2$—Si—$(OR)_2$ or $R^*$—Si—$(OR)_3$, wherein $R^*$, independently at each occurrence, is an optionally substituted C1-C15 alkyl, optionally substituted C4-C20 heteroalkyl, optionally substituted aryl, or optionally substituted heteroaryl, and R, independently at each occurrence, is an optionally substituted C1-C6 alkyl. In some embodiments, the organosilane is $C_6H_{13}$—Si—$(OR)_3$.

As used herein, the term "alkyl" includes straight-chain, branched-chain, and cyclic monovalent hydrocarbyl radicals, and combinations thereof, which contain only C and H when they are unsubstituted. The term "alkyl," as used herein, includes cycloalkyl and cycloalkylalkyl groups. Examples include methyl, ethyl, isobutyl, cyclohexyl, cyclopentylethyl, and the like. The total number of carbon atoms in each such group is sometimes described herein, e.g., when the group can contain up to ten carbon atoms, it can be represented as 1-10C, C1-C10, $C_1$-$C_{10}$, C1-10, or $C_{1-10}$. The term "heteroalkyl," as used herein, means the corresponding hydrocarbons wherein one or more chain carbon atoms have been replaced by a heteroatom. Exemplary heteroatoms include N, O, S, and P. When heteroatoms are allowed to replace carbon atoms, for example, in heteroalkyl groups, the numbers describing the group, though still written as e.g. C3-C10, represent the sum of the number of carbon atoms in the cycle or chain plus the number of such heteroatoms that are included as replacements for carbon atoms in the cycle or chain being described.

Alkyl groups can be optionally substituted to the extent that such substitution makes sense chemically. Typical substituents include, but are not limited to, halogens (F, Cl, Br, I), =O, =NCN, =NOR, =NR, OR, $NR_2$, SR, $SO_2R$, $SO_2NR_2$, $NRSO_2R$, $NRCONR_2$, NRC(O)OR, NRC(O)R, CN, C(O)OR, $C(O)NR_2$, OC(O)R, C(O)R, and $NO_2$, wherein each R is independently H, C1-C8 alkyl, C2-C8 heteroalkyl, C1-C8 acyl, C2-C8 heteroacyl, C2-C8 alkenyl, C2-C8 heteroalkenyl, C2-C8 alkynyl, C2-C8 heteroalkynyl, C6-C10 aryl, or C5-C10 heteroaryl, and each R is optionally substituted with halogens (F, Cl, Br, I), =O, =NCN, =NOR', =NR', OR', $NR'_2$, SR', $SO_2R'$, $SO_2NR'_2$, $NR'SO_2R'$, $NR'CONR'_2$, NR'C(O)OR', NR'C(O)R', CN, C(O)OR', $C(O)NR'_2$, OC(O)R', C(O)R', and $NO_2$, wherein each R' is independently H, C1-C8 alkyl, C2-C8 heteroalkyl, C1-C8 acyl, C2-C8 heteroacyl, C6-C10 aryl or C5-C10 heteroaryl. Alkyl groups can also be substituted by C1-C8 acyl, C2-C8 heteroacyl, C6-C10 aryl or C5-C10 heteroaryl, each of which can be substituted by the substituents that are appropriate for the particular group.

"Aromatic" or "aryl" substituent or moiety refers to a monocyclic or fused bicyclic moiety having the well-known characteristics of aromaticity; examples of aryls include phenyl and naphthyl. Similarly, "heteroaromatic" and "heteroaryl" refer to such monocyclic or fused bicyclic ring systems which contain as ring members one or more heteroatoms. Suitable heteroatoms include N, O, and S, inclusion of which permits aromaticity in 5-membered rings as well as 6-membered rings. Typical heteroaromatic systems include monocyclic C5-C6 aromatic groups such as pyridyl, pyrimidyl, pyrazinyl, thienyl, furanyl, pyrrolyl, pyrazolyl, thiazolyl, oxazolyl, and imidazolyl, and fused bicyclic moieties formed by fusing one of these monocyclic groups with a phenyl ring or with any of the heteroaromatic monocyclic groups to form a C8-C10 bicyclic group such as indolyl, benzimidazolyl, indazolyl, benzotriazolyl, isoquinolyl, quinolyl, benzothiazolyl, benzofuranyl, pyrazolopyridyl, quinazolinyl, quinoxalinyl, cinnolinyl, and the like. Any monocyclic or fused ring bicyclic system which has the characteristics of aromaticity in terms of electron distribution throughout the ring system is included in this definition. It also includes bicyclic groups where at least the ring which is directly attached to the remainder of the molecule has the characteristics of aromaticity. Typically, the ring systems contain 5-14 ring member atoms. Typically, monocyclic heteroaryls contain 5-6 ring members, and bicyclic heteroaryls contain 8-10 ring members.

Aryl and heteroaryl moieties can be substituted with a variety of substituents including C1-C8 alkyl, C2-C8 alkenyl, C2-C8 alkynyl, C5-C12 aryl, C1-C8 acyl, and heteroforms of these, each of which can itself be further substituted; other substituents for aryl and heteroaryl moieties include halogens (F, Cl, Br, I), OR, $NR_2$, SR, $SO_2R$, $SO_2NR_2$, $NRSO_2R$, $NRCONR_2$, NRC(O)OR, NRC(O)R, CN, C(O)OR, $C(O)NR_2$, OC(O)R, C(O)R, and $NO_2$, wherein each R is independently H, C1-C8 alkyl, C2-C8 heteroalkyl, C2-C8 alkenyl, C2-C8 heteroalkenyl, C2-C8 alkynyl, C2-C8 heteroalkynyl, C6-C10 aryl, C5-C10 heteroaryl, C7-C12 arylalkyl, or C6-C12 heteroarylalkyl, and each R is optionally substituted as described above for alkyl groups. The substituent groups on an aryl or heteroaryl group can be further substituted with the groups described herein as suitable for each type of such substituents or for each component of the substituent. Thus, for example, an arylalkyl substituent can be substituted on the aryl portion with substituents described herein as typical for aryl groups, and it can be further substituted on the alkyl portion with substituents described herein as typical or suitable for alkyl groups.

"Optionally substituted," as used herein, indicates that the particular group being described can have one or more hydrogen substituents replaced by a non-hydrogen substituent. In some optionally substituted groups or moieties, all hydrogen substituents are replaced by a non-hydrogen substituent (e.g., a polyfluorinated alkyl such as trifluoromethyl). If not otherwise specified, the total number of such substituents that can be present is equal to the number of H atoms present on the unsubstituted form of the group being described. Where an optional substituent is attached via a double bond, such as a carbonyl oxygen or oxo (=O), the group takes up two available valences, so the total number of substituents that may be included is reduced according to the number of available valences. As used herein, optional substituents include negatively charged groups, negatively chargeable groups, positively charged groups, positively chargeable groups, hydrophilic groups, and hydrophobic groups. In some embodiments, optional substituents include a group oxidizable to a sulfonic acid group, a thiol group (i.e., S—H), an alkylthiol group, sulfonic acid group, carboxylic acid group, amino group, and ammonium group.

In some embodiments, the ceramic precursors comprise groups, e.g., optional substituents, which functionalize the membranes. For example, in some embodiments, the ceramic precursor comprises a silane with a sulfonic acid group to improve proton conductivity or molecular selectivity. Exemplary compounds include 3-trihydroxysilyl-1-propanesulfonic-acid and triethoxy(hexyl)silane. Other embodiments include a silane with a long alkane group to improve durability or reduce pore size. Exemplary silanes include triethoxy(hexyl)silane.

In some embodiments, the ceramic precursor comprises colloidal ceramic particles. Exemplary colloidal ceramic particles include colloidal silica particles, for example, Ludox® particles. In some embodiments, colloidal silica particles, e.g., Ludox® particles, are mixed with a bifunctional ($R^*_2$—Si—$(OR)_2$) or a trifunctional organosilane ($R^*$—Si—$(OR)_3$). Suitable colloidal particles include Ludox® SM-30, Ludox® HS-40, and Ludox® CL. The type of organosilane used in combination with the colloidal silica particles depends on the membrane application. For example, to prepare a membrane for use in flow batteries, organosilane comprising alkyl groups can be used to aid selectivity and organosilane comprising sulfonic groups can be used to aid proton conductivity. Preparation of an exemplary membrane using a ceramic precursor comprising colloidal particles is described in the Examples below.

Ceramic precursors comprising elements other than silicon (Si) can be used in the preparation of the nanoporous selective sol-gel ceramic membranes disclosed herein. In some embodiments, the ceramic precursor comprises a titanium compound of the formula $Ti(OH)_x(OR)_y$, wherein R, independently at each occurrence, is an optionally substituted C1-C6 alkyl, x is an integer ranging from 0 to 4, and x is an integer ranging from 0 to 4, and the sum of x and y is 4. In some embodiments, the ceramic precursor comprises titanium alkoxides, including tetraisopropoxide (TTIP) and/or its partially hydrolyzed species, for example, as illustrated in the Examples below.

In certain embodiments, the ceramic precursor comprises an aluminum compound $Al(OR)_3$, wherein R, independently at each occurrence, is H or an optionally substituted C1-C6 alkyl. Aluminum alkoxides, including aluminum isopropoxide (ATP), are some of the exemplary compounds suitable for use as ceramic precursors of the membranes disclosed herein.

In some embodiments, the ceramic precursor comprises a germanium alkoxide. Suitable germanium alkoxides include, but are not limited to, mon-, di-, tri-, and tetraalkoxy germanane, such as, tetraethoxygermane, tetramethoxygermane, tetrapropoxygermane, and tetrabutoxygermane. The germania-based sol-gel precursor can also be hydrolyzed germanium alkoxide monomers, dimers, and/or trimers. In some embodiments, ceramic precursors comprise tetraalkyl orthogermanate $Ge(OR)_4$. In some embodiments, ceramic precursors comprising mixtures of tetraethyl orthosilicate, $Si(OC_2H_5)_4$ and tetraethyl orthogermanate, $Ge(OC_2H_5)_4$ can be useful in preparation of the nanoporous membranes disclosed herein.

In some embodiments, sol-gel precursor composition comprising multiple components described above can also be used as independent precursors or as composite precursors such as core-shell particles (e.g. alumina-coated silica nanoparticles). The precursor can be a pure material or a solution or dispersion in water and/or one or more other solvents. Further, the ceramic precursors can be applied as an emulsion or dispersion in water or other suitable solvents.

Additives

In certain embodiments, additives are added to a sol-gel precursor composition in order to enable specific desirable properties of the nanoporous selective sol-gel ceramic membrane when formed.

In some embodiments, the sol-gel precursor composition further comprises an additive selected from the group consisting of a selectivity additive configured to increase ion transport properties of the nanoporous selective sol-gel ceramic membrane, a durability additive configured to improve durability of the nanoporous selective sol-gel ceramic membrane, and a catalyst additive configured to add catalytic properties to the nanoporous selective sol-gel ceramic membrane. Suitable additives include catalyst, an ion-conducting polymer, electrically conductive particles, mechanical properties-improving materials, and a combination thereof.

In certain embodiments, the additive is a selectivity additive selected from the group consisting of an ionic-conducting polymer and a gas conducting polymer. To improve selectivity, in certain embodiments a polymer is an additive used to facilitate selective ion transport. For example, proton conducting polymers such as polystyrene sulfonate (PSS), polydiallyldimethylammonium chloride (PolyDADMAC), sulfonated nanocrystalline cellulose, sulfonated poly ether ether ketone (SPEEK), sulfonated polybenzimidazole (S-PBI) or perfluorosulfonic acid (PFSA). In other embodiments, the additive is a polymers (i.e., polyvinyl alcohol, polyacrylic acid, polyacrylamide, polyethylene glycol and others) promoting selective transport of other molecules (e.g., gases or other ions). Any additive polymers are soluble or dispersible in the sol-gel precursor composition. Furthermore, they must be able to handle the harsh environments or be protected from degradation by the oxide.

In some embodiments, the additive is a durability additive selected from the group consisting of a low Young's modulus polymer configured to provide increased flexibility to the ceramic selective membrane and a high Young's modulus polymer configured to provide increased durability to the nanoporous selective sol-gel ceramic membrane.

In certain embodiments, the durability additive is a polymer. A low Young's modulus polymer additive will lead to flexibility of the final membrane or a high Young's modulus will lead to improved durability of the final membrane. These are soluble or dispersible in the sol-gel precursor composition able to handle the harsh environments defined earlier or be protected from degradation by the oxide. Representative durability polymer additives include polyvinyl alcohol, polyacrylic acid, polyacrylamide, and polyethylene glycol, as well as combinations and copolymers thereof.

In one embodiment, the additive is a catalyst additive selected from the group consisting of catalytic particles added to the sol-gel precursor composition and catalytic particles formed within the sol-gel precursor composition. The catalyst additive is selected from the following schemes: (1) the addition of catalytic nano- or microparticles to the sol; (2) forming catalytic particles within the sol (e.g., prior to gelation/self-assembly); (3) forming catalytic particles during the sol-gel; and (4) applying/coating the surface of the active area with catalytic particles after it is cured. Platinum is an example a catalyst additive. In an embodiment, the catalyst additive is suitable to handle the harsh environments to which the membrane is exposed (if contained externally) or is protected from degradation by the ceramic membrane (if contained internally). In one embodiment, the catalyst additive is 10 vol % or less of the nanoporous selective sol-gel ceramic membrane.

The additives disclosed herein can be present in the final membranes in any suitable amounts, which are specific to the additive used. For example, for PSS & PDDA, it is typically advantageous to have a final membrane loading (i.e., dry with water/solvent removed) of between about 3 wt % and about 40 wt %, between about 3 wt % and about 20 wt %, between about 3 wt % and about 10 wt %. In certain embodiments, the additive is present in an amount of 10 volume % or less of the sol-gel precursor composition.

Solvents

In some embodiments, the sol-gel precursor composition further comprises one or more organic solvents. Any suitable organic solvent can be included in the sol-gel precursor. In some embodiments, the organic solvent is a C1-C5 alcohol or a C6 arylene. Exemplary solvents include methanol, ethanol, isopropanol, propanol, butanol, toluene, xylene, and mixtures thereof. The organic solvent is typically added in the amount specific to the sol-gel precursor composition used. For example, for compositions comprising TEOS, water, and an organic solvent, the molar ratios of the TEOS:Water:Organic Solvent components are: 1:1-4:1-2 or 1:1-3:1. For example, in some embodiments, when ethanol is used as an organic solvent, the sol-gel precursor composition includes TEOS:Water:Ethanol in the molar ratios of 1:1:1, 1:2:1, 1:3:1, or 1:4:1. In other embodiments, when isopropanol is used, the sol-gel precursor composition includes TEOS:Water:Isopropanol in the molar ratios of 1:1:1, 1:2:1, 1:3:1 or 1:4:1. Typically, water with a pH in the range of 0-4 is used in the sol-gel precursor compositions.

In some embodiments, the sol-gel precursor compositions do not include an organic solvent. In some embodiments, the sol-gel precursor compositions further include an acid or base suitable to catalyze the hydrolysable gelation of the ceramic precursor. In some embodiments, a component of the ceramic precursor comprises a basic group or an acidic group that can serve as a gelation catalyst. For example, PSS comprises sulfonic acid groups suitable to act as an acid catalyst for gelation of sol-gel precursor compositions comprising TEOS and aqueous solutions of PSS, as demonstrated in the Examples.

In certain embodiments, the sol-gel precursor composition comprises (a) a ceramic precursor, such as silica (e.g., siloxane), ormosils, titania, germania, zirconia, alumina, graphite, silicon carbide, silicon nitride, boron nitride or others, and (b) optionally a solvent, such as an alcohol (e.g., methanol, ethanol, isopropanol, butanol, etc.) or an aromatic (e.g., toluene, xylene, etc.). The mixture of these two components typically accounts for about 30 volume % or less of the sol-gel precursor composition, about 20 volume % or less of the sol-gel precursor composition, or about 10 volume % or less of the sol-gel precursor composition. In some embodiments, the sol-gel precursor composition further comprises water in the amount of about 40 volume % or less of the sol-gel precursor composition, about 30 volume % or less of the sol-gel precursor composition, or about 20 volume % or less of the sol-gel precursor composition.

In some embodiments, the sol-gel precursor composition or a pre-treatment composition is a solution, gel or slurry comprising water and/or solvent: such as alcohols (e.g., methanol, ethanol, isopropanol, butanol, etc.) or aromatics (e.g., toluene, xylene, etc.) present in the amount of about 80 volume % or less of the composition, about 60 volume % or less of the composition, or about 50 volume % or less of the composition. Additionally, the sol-gel precursor composition or a pre-treatment composition comprises a colloidal suspension or a nanoparticle dispersion of ceramics (e.g. silica, titania, germania, alumina, etc.), present in the amount of about 50 volume % of the composition, about 40 volume % of the composition, or about 20 volume % of the composition.

In some embodiments, a post-treatment composition, e.g., chemical bath for dipping the sol-gel membrane comprises water and an acid, such as sulfuric acid, hydrochloric acid, phosphoric acid, nitric acid, methansulfonic acid, polystyrene sulfonic acid, acetic acid, or a mixture thereof. The acid concentrations typically are between about 10 M and about 0.1 M, or between about 2.5 M and about 0.5 M. The post-treatment composition can further comprise salts containing cationic groups such as sodium, calcium, lithium, ammonium, or magnesium and anionic groups such as chloride, bromide, carbonate, sulfate, sulfonate, iodide, phosphate, nitrite, nitrate, chlorate, borate, thiocyanate, thiosulfate and sulfide. Typically, the salt concentration is between about 1 M and about 0.01 M or between about 1 M and about 0.1 M.

Methods of Preparing Nanoporous Selective Sol-Gel Ceramic Membranes

Any suitable gelation method can be used to form the membranes disclosed herein from the components described above. For example, in some embodiments, gelling the sol-gel precursor compositions comprises chemical gelation, including hydrolyzing chemical gelation, non-hydrolyzing chemical gelation, and combinations thereof.

In one embodiment, chemical gelation comprises exposing the sol-gel precursor composition to an acid solution. In one embodiment, the acid solution is greater than 0.001 N. In one embodiment, the acid solution is greater than 1 N. In one embodiment, the acid solution is greater than 3 N. Suitable acids can be selected from the group consisting of sulfuric acid, nitric acid, acetic acid, hydrochloric acid, methane sulfonic acid, and phosphoric acid.

Figure 2:
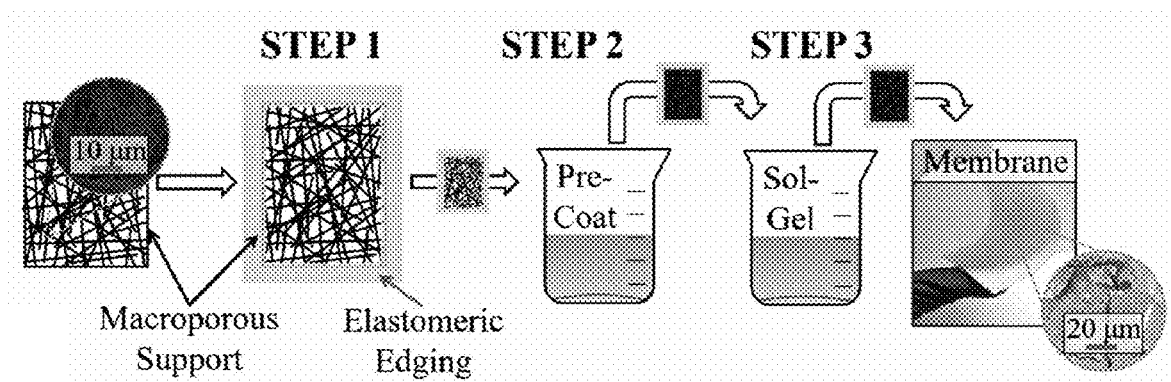
FIG. 2 illustrates a method, in accordance with an embodiment of the disclosure, for preparing an exemplary nanoporous selective sol-gel ceramic composite membrane. Step 1: Apply edging. Step 2: Pre-coating containing performance enhancing materials. Step 3: Sol-gel coating from precursor solution.
Figure 3:
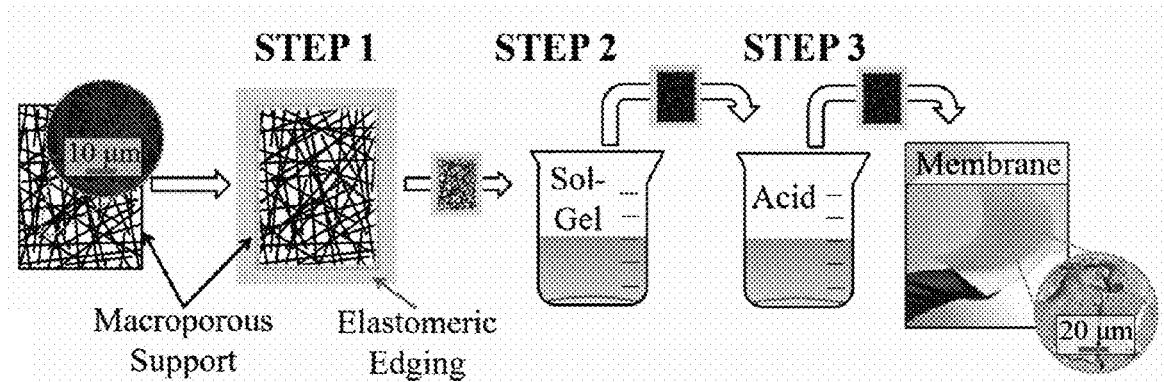
FIG. 3 illustrates a method, in accordance with an embodiment of the disclosure, for preparing an exemplary nanoporous selective sol-gel ceramic composite membrane. Step 1: Apply edging. Step 2: Sol-gel coating from precursor solution. Step 3: Dip in an acid or salt bath to induce further gelation.

FIGS. 1-3 outline the steps of exemplary methods of preparation of the membranes disclosed herein.

Referring to FIG. 1, a polymer is added to a porous support such that the polymer infiltrates the macroporous support by at least 1 µm to ensure adhesion between the support and polymer. This step forms an edging that surrounds the active area. The polymer can be added to the edge of a macroporous support that is cut to size such that the polymer extends beyond the edge of the macroporous support by at least 1 μm, at least 1 mm, or at least 1 cm. In some embodiments, the polymer or compressible edging does not extend past the outer edge of the macroporous support. The edge of the polymer support that extends beyond the membrane must form a liquid tight seal with the polymer on the other side of the support. The polymer can be applied as a film/sheet using heating, solvent or radiation or the polymer can be applied from a liquid phase as a solution or dispersion using common coating techniques (e.g., dip, spray, drop, blade, screen). In some embodiments, the polymer can be formed in situ by applying a composition comprising a monomer or an oligomer capable of in situ polymerization reaction and then polymerized to form compressible edging.

In some embodiments, the macroporous support not covered by polymer can represent >50% of the grid surface area, ideally >95%. Additionally, the area of the support not covered by polymer is typically between 1 cm$^2$ to 10 m$^2$. Following application of the polymer, a sol-gel based coating can be applied within the porous support to create a nanoporous membrane structure. The membrane formed by the above described process typically has an average pore size of about 5 nm or less with a polydispersity index of about 0.5 or less or about 0.25 or less. The sol-gel can be applied using standard coating processes such as dip, spray, blade, screen printing, jet, brush, etc. In some embodiments, the steps of application of the edging and the application of the sol-gel ceramic precursor described above can be reversed.

After coating with the sol-gel precursor, a reaction proceeds such that the membrane is allowed to sit for at least 1 minute. In some embodiments, the reaction is allowed to proceed for up to 48 hours to induce self-assembly of the sol-gel solution to produce the desired nanoporosity. In some embodiments, the self-assembly process can take place in a controlled atmosphere (e.g., humidity and temperature). This self-assembly process can take place with the membrane against a flat solid surface, against a flat porous surface or with the membrane hung vertically. In some embodiments, it can be advantageous to coat the macroporous support multiple times. In some embodiments, the interval between two coatings is about 30 minutes, about 20 minutes, or about 10 minutes.

In some embodiments, it is advantageous to add a third optional step of dip coating (or drop coating, blade coating, spray coating) the active area of the membrane into a liquid of lower surface tension than the sol-gel precursor composition. This step can provide membranes with reduced cracking of the membrane if drying is desired. Suitable liquids include alcohol, water, and alcohol-water mixtures. A small concentration of surfactant can be added to the liquids.

In some embodiments, it is advantageous to add a fourth optional step which is to dry the membrane. Typical drying can be done at temperatures up to about 400° C., up to about 150° C., or up to about 80° C. In some embodiments, the membranes are dried to 5-10% water content, such that the sol-gel collapses but it does not become brittle or crack during handling.

In some embodiments, the membrane can be further heated to a higher temperature after the sol-gel coating dries at room temperature. The temperature can be in the range of about 250° C. to about 450° C. In some embodiments, the membrane is heated at the target temperature for about 2 hours. In some embodiments, the membrane is heated at the target temperature for up to about 48 hours. In some embodiments, the additional heating produces a more compact membrane.

Referring to FIG. 2, a polymer is added to a porous support such that the polymer infiltrates the macroporous support, as described for FIG. 1. A pre-coating solution, gel, or slurry of a pre-coating material is then applied within or on top of the porous support to enhance the mechanical, chemical or electro-chemical stability of the support structure. The pre-coating solution, gel, or slurry can be applied using standard coating processes such as dip, spray, blade, screen printing, jet, brush, or a combination thereof.

After the pre-coating, the porous support is dried to remove about 90 to about 100 volume % of the liquid phase of the pre-coating solution, gel, or slurry such the pre-coating materials adhere to the porous support. Drying generally takes about 24 hours or less. In some embodiments, drying takes about 5 minutes. The drying times generally depend on the nature of the liquid phase used in the pre-coating solution, gel, or slurry. Drying can take place at any temperature between room temperature and about 100° C. This step can be repeated up to three times using the same or different pre-coating compositions in order to sufficiently enhance the properties of the macroporous support prior to sol-gel coating.

Following the pre-coating step, the composite comprising a nanoporous sol-gel ceramic composite filling at least a portion of the porous support can be formed as described above for the method depicted in FIG. 1. Further post-treatment steps can be used as described above.

Referring to FIG. 3, a polymer is added to a porous support such that the polymer infiltrates the macroporous support, as described for FIG. 1, and a pre-coating step can be optionally performed as described in FIG. 2 above. After sol-gel precursor composition is applied, the membrane is exposed to an acid or salt solution for a period of at least 10 seconds, greater than about 4 hours, or about 24 hours. This step can be utilized to control the pore size, shape and structure of sol-gel coating by changing the kinetics of gelation. The formed membrane can be subjected to the post-treatment steps as described above.

In some embodiments, the membranes disclosed herein are subjected to a post-treatment step after gelation of the sol-gel precursor compositions. Post-treatment provides another route to providing specific properties to the membrane. Post treatment can be used along with additives, or instead of additives, to generate a membrane with specific properties. For example, silanes can be used to functionalize the membranes disclosed herein. This includes a silane with a sulfonic acid group to improve proton conductivity or molecular selectivity. Other embodiments include a silane with a long alkane group to improve durability or reduce pore size. Exemplary post-treatment reagents include 3-trihydroxysilyl-1-propanesulfonic-acid and triethoxy(hexyl)silane.

In some embodiments, a step of applying a pretreatment to the porous membrane support prior to the step of applying the sol-gel precursor compositions to the porous membrane support is included in the preparation of the nanoporous selective sol-gel ceramic membranes. For example, the porous membrane support can be coated with a polymer (e.g., polystyrene sulfonic acid).

The nanoporous selective sol-gel ceramic membranes described herein are suitable for use in many applications, for example, as battery membranes, fuel-cell membranes, an electrodialysis membranes, an acid recovery membranes, chloro-alkali membranes, solvent extraction membranes, electrodeposition membranes, electrodeioniziation membranes, nutrient recovery membranes, food processing membranes, reverse osmosis membranes, gas separation membranes, and a bio-separation membranes. In some embodiments, the nanoporous selective sol-gel ceramic membrane is an ion-conducting membrane for a flow battery. In other embodiments, the nanoporous selective sol-gel ceramic membrane is an ion-conducting membrane for a fuel cell. In yet other embodiments, the nanoporous selective sol-gel ceramic membrane is an ion-conducting membrane for electrodialysis or an ion-conducting membrane for chloro-alkali processes.

Characterization of the Nanoporous Selective Sol-Gel Ceramic Composite Membranes The membranes disclosed herein comprise a plurality of nanopores. In some embodiments, the membrane have porosity between about 10 vol % and 90 vol %, between about 50 vol % and 90 vol %, or between about 70 vol % and 90 vol %. In one embodiment, the ceramic selective membrane comprises pores in the size range of 0.1 nm to 10 nm in diameter. The pore size is the final pore size of nanoporous selective sol-gel ceramic membrane, including all layers of ceramic and any pretreatment or post-treatment layers. In one embodiment, the ceramic selective membrane comprises pores in the size range of 0.1 nm to 5 nm in diameter. In one embodiment, the ceramic selective membrane comprises pores in the size range of 0.1 nm to 1 nm in diameter. In one embodiment, the ceramic selective membrane comprises pores in the size range of 0.5 nm to 1 nm in diameter.

In some embodiments, the nanoporous composite of the membranes disclosed herein comprises a plurality of nanopores of about 5 nm or smaller in radius with a polydispersity index of about 0.7 or lower. In some embodiments, the plurality of nanopores has a polydispersity index of about 0.6 or lower, about 0.5 or lower, about 0.3 or lower, or about 0.25 or lower.

Typically, the membranes disclosed herein have a thickness between 5 μm and 1 mm. In one embodiment, the nanoporous selective sol-gel ceramic membrane has a thickness in the range of 0.1 mm to 1 mm. In one embodiment, the ceramic selective membrane has a thickness in the range of 0.1 mm to 0.5 mm. In one embodiment, the ceramic selective membrane has a thickness in the range of 0.2 mm to 0.4 mm.

Advantageously, the membrane disclosed herein experiences about 5% or less linear expansion in the x-, y- or z-directions according to the ASTM D756 standard practice for determination of weight and shape changes of ion exchange membranes. In one embodiment, the membranes' linear expansion in the x-, y- or z-directions according to the ASTM D756 standard practice is about 1% or less. In another embodiment, the membranes' linear expansion in the x-, y- or z-directions according to the ASTM D756 standard practice is about 0.5% or less.

The nanoporous selective sol-gel ceramic membranes have an ionic area specific resistance (ASR) in the range of 0.01 Ohm*cm$^2$ to 10 Ohm*cm$^2$ when measured in 4 M H$_2$SO$_4$ or in the range of 0.1 Ohm*cm$^2$ to 100 Ohm*cm$^2$ when measured in 0.5 M NaCl, when ASR measurements are performed using a galvanodynamic sweep from 0 to 0.5 Amps in an h-cell with luggin capillaries and the cell ionic resistance is subtracted to obtain the ASR. The method and setup can be found in S. Slade et al., "Ionic Conductivity of an Extruded Nafion® 110 EW Series of Membranes", J. Electrochemical Society, 149 (12), A1556-A1564 (2002). In one embodiment, membranes have an ASR in the range of between about 0.08 Ohm*cm$^2$ and about 0.5 Ohm*cm$^2$ when measured in 4 M H$_2$SO$_4$. In one embodiment, membranes have an ASR in the range of between about between about 0.6 Ohm*cm$^2$ and about 15 Ohm*cm$^2$ when measured in 0.5 M NaCl.

Nanoporous Selective Sol-Gel Ceramic Membranes with Fractal Nanoporous Structure In an aspect, the present disclosure provides a nanoporous selective sol-gel ceramic membrane comprising a porous support and a nanoporous composite disposed on the porous support wherein the nanoporous composite comprises a nanoporous sol-gel ceramic having a fractal nanoporous structure. As discussed further herein, such a fractal nanoporous structure can be determined by fitting small-angle scattering spectra of the nanoporous sol-gel ceramic to a mathematical model. In an embodiment, the nanoporous selective sol-gel ceramic membrane is a nanoporous selective sol-gel ceramic membrane as described elsewhere herein.

As discussed further herein, in an embodiment, the porous support defines a number of pores. In an embodiment, the pores have an average diameter of 10 nm or greater. In this regard, as the nanoporous composite comprising the nanoporous sol-gel ceramic composite fills at least a portion of the porous support the nanoporous composite defines, at least in part, an active area of the nanoporous selective sol-gel ceramic membrane. As discussed further herein, such an active area is suitable to selectively allow passage of fluid and, for example, ions through the nanoporous selective sol-gel ceramic membrane, such as for filtration, ion exchange, flow batteries, and the like.

In the present aspect, small-angle scattering spectra of the nanoporous sol-gel ceramic may be fit to a mathematical model. In an embodiment, the mathematical model is a fractal aggregate model. As an example, the fractal aggregate model may be a fractal aggregate model as described in J Teixeira, J. Appl. Cryst., 21 (1988) 781-785, which is incorporated herein by reference in its entirety. In this regard, the nanoporous sol-gel ceramic composite has a fractal structure defined, at least in part, by a fractal dimension, $D_f$, and a correlation length, $\xi$, as discussed further herein. The scattering spectra which may be fit to the mathematical model can include small-angle scattering spectra. Such small-angle scattering spectra are suitable to provide information about the inner structure of the nanoporous selective sol-gel ceramic membrane including, particularly, the nanoporous sol-gel ceramic. Analysis of such small-angle scattering spectra, particularly of elastic scattering of particles off of, for example, the nanoporous sol-gel ceramics provide information regarding pore size, particle arrangement, and the like.

In an embodiment, the small-angle scattering spectra includes small-angle scattering spectra selected from the group consisting of small-angle x-ray scattering spectra, small-angle neutron scattering spectra, small-angle light scattering spectra, and combinations thereof. In an embodiment, the small-angle scattering spectra include small-angle x-ray scattering spectra.

Figure 22B:
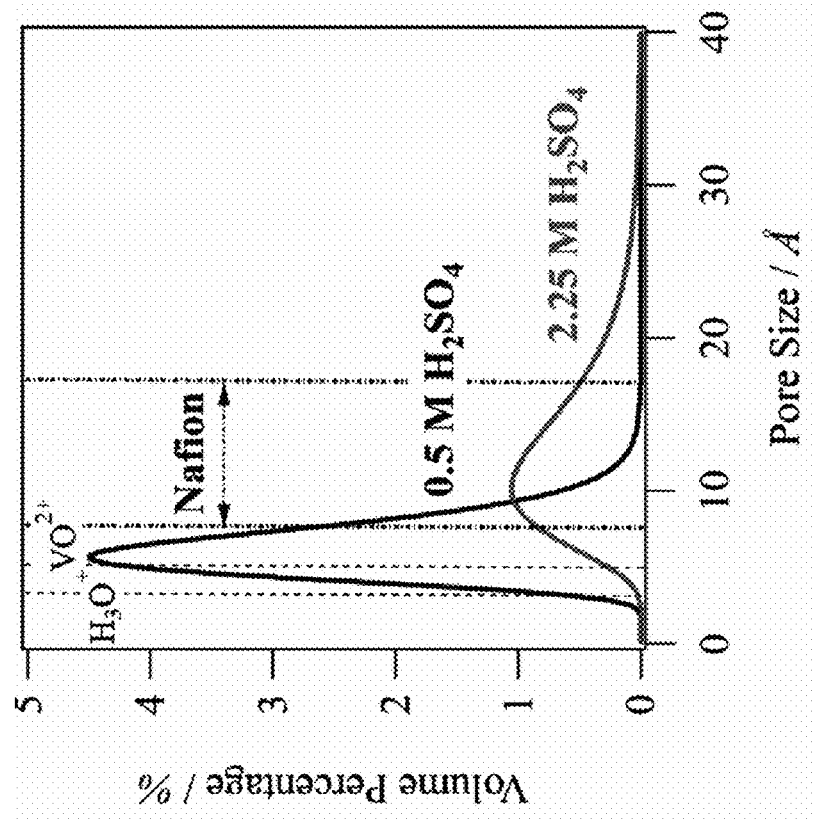
FIG. 22B is a graph of pore size (radius) distributions of the Nafion® membrane and the ceramic membranes of FIG. 22A based on SAXS modeling.
Figure 22A:
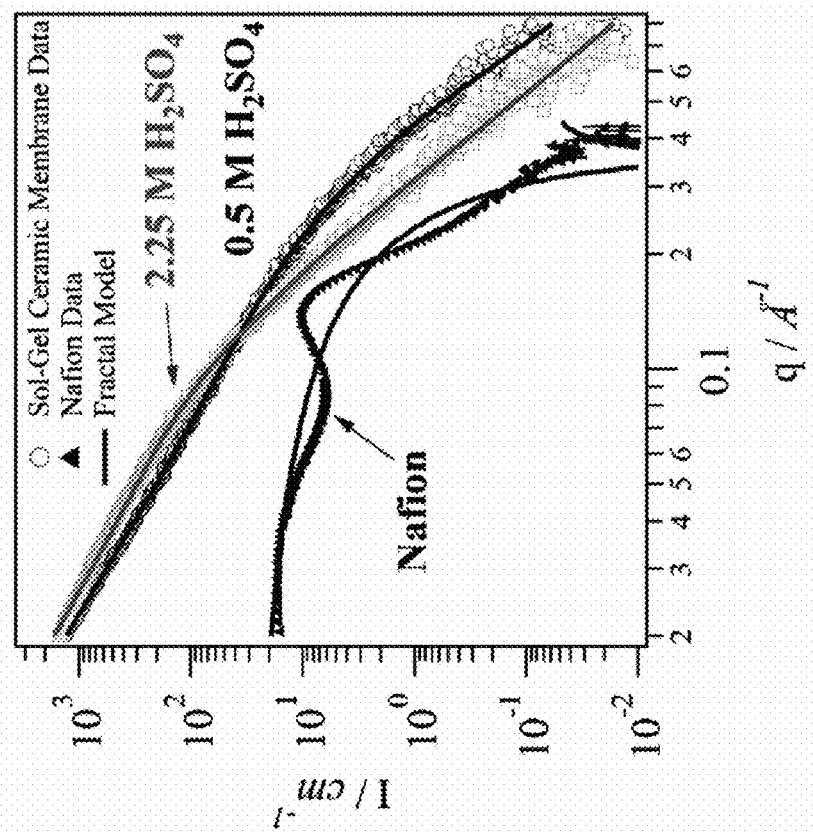
FIG. 22A shows SAXS profiles of a Nafion® membrane and two nanoporous sol-gel ceramic membranes, in accordance with an embodiment of the disclosure, gelled in different acid conditions and fit with a fractal aggregate model.
Figure 23:
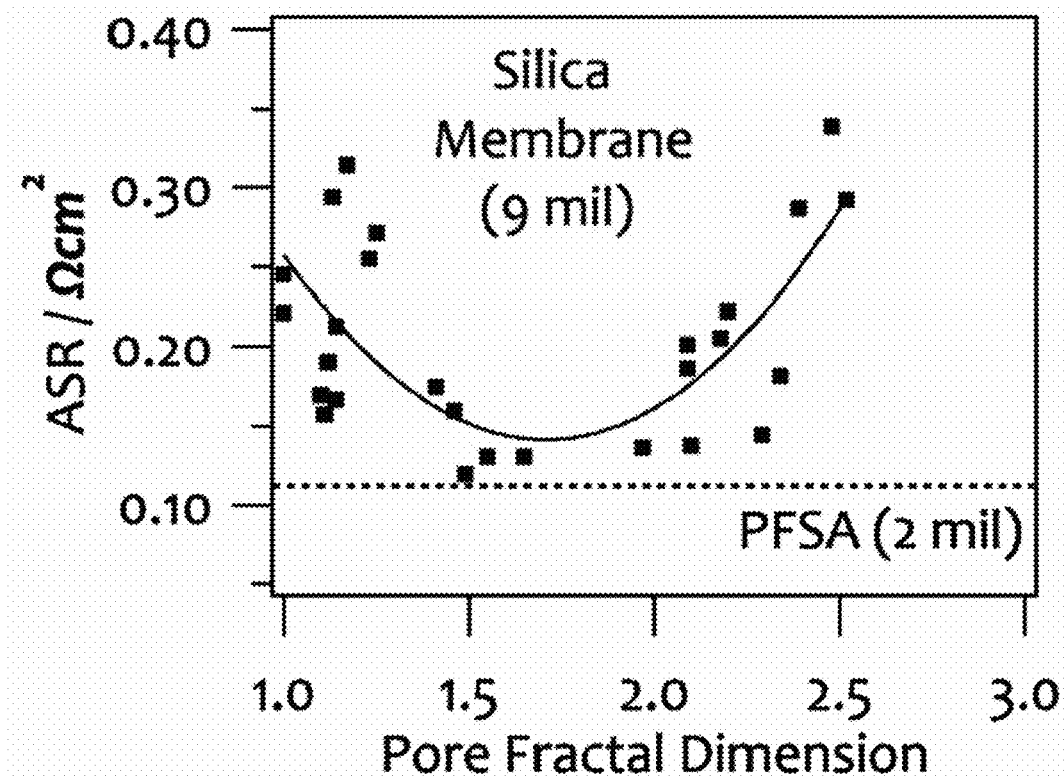
FIG. 23 is a graph of proton transport as represented by the ionic ASR of an a membrane, according to an embodiment of the disclosure, based on the volume fraction of porosity for 9 mm-thick nanoporous silica membranes as compared to a 2 mm-thick Nafion® membrane (PFSA).
Figure 24:
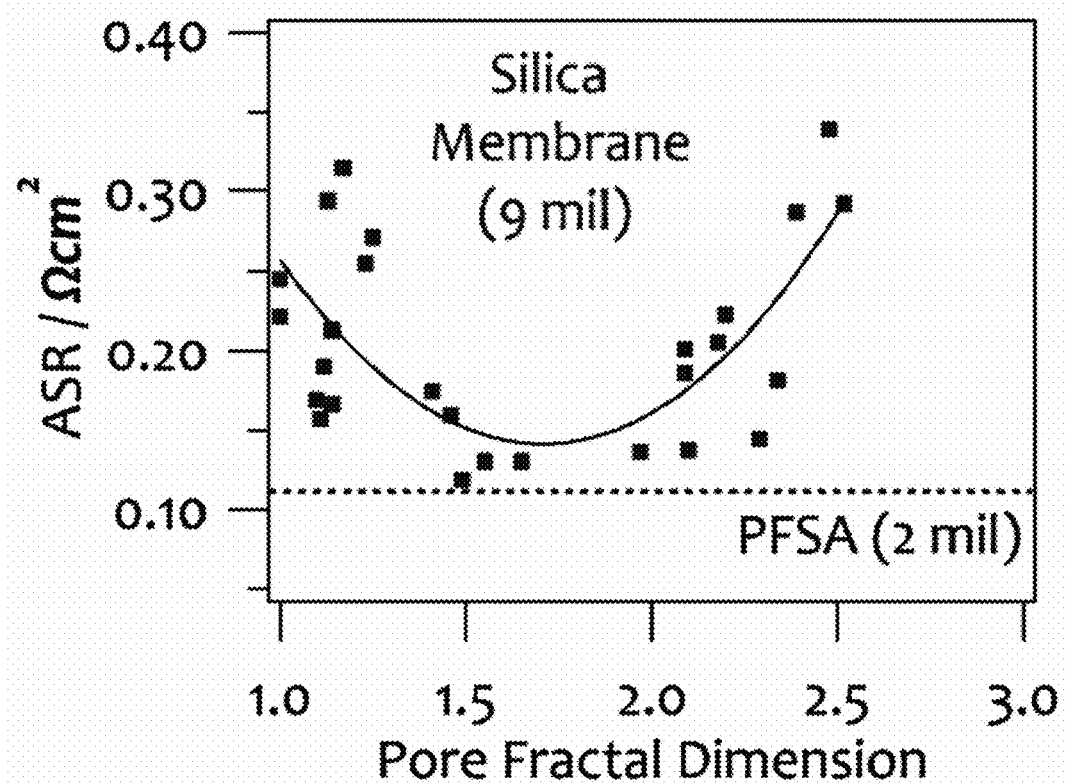
FIG. 24 is a graph of proton transport as represented by the ionic area specific resistance (ASR) of a membrane based on the fractal dimension for 9 mm-thick nanoporous silica membranes, as compared to a 2 mm-thick Nafion® membrane (PFSA).
Figure 25:
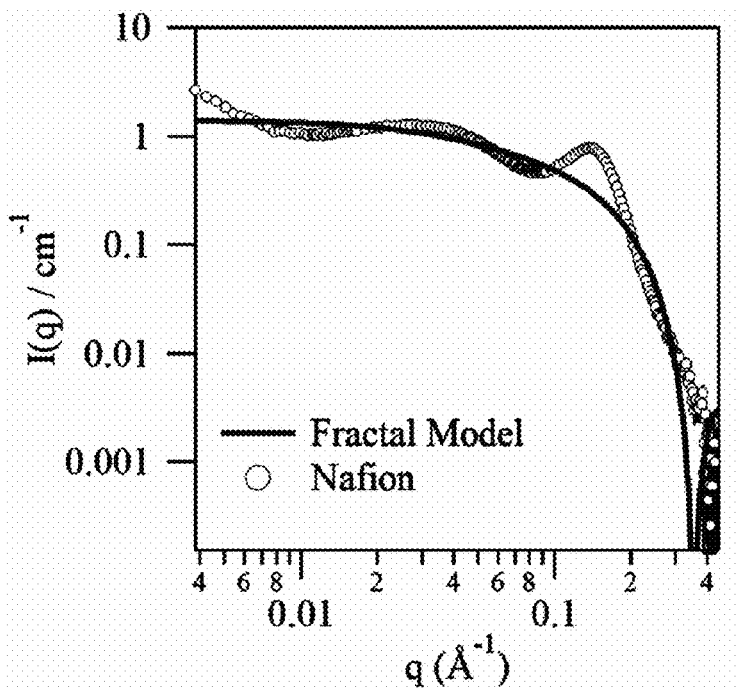
FIG. 25 is a SAXS profile fitting of a hydrated, nanoporous Nafion® membrane with a fractal aggregate model to demonstrate that commercial membranes have an intrinsically different nano-structure. This model fitting generates a $Chi^2/N_{pt}$ of 830, indicating that the Nafion® membrane does not have a fractal structure.

In an embodiment, the small-angle scattering spectra of the nanoporous sol-gel ceramic fit closely to the mathematical model. In this regard, a least squares regression fit of a de-smeared, 1-dimensional small-angle scattering spectra to the fractal aggregate model provides a $\chi^2/N_{pt}$ value of less than 10, wherein $\chi^2$ is a squared sum of an intensity difference between the fractal aggregate model and small-angle scattering spectra data, and $N_{pt}$ is a number of small-angle scattering data points over a model fitting range. Such a relatively low $\chi^2/N_{pt}$ value is indicative of a good fit between the small-angle scattering spectra and the fractal aggregate model. In an embodiment, $\chi^2/N_{pt}$ value is less than 5. In an embodiment, $\chi^2/N_{pt}$ value is less than 1. As discussed further herein with respect to FIG. 22A, the small-angle scattering spectra of the nanoporous sol-gel ceramic generally have a $\chi^2/N_{pt}$ value less than 10, and frequently less than 5. This is in contrast to the porous structures, such as Nafion®, that do not have a fractal structure. As discussed with respect to FIG. 22A, Nafion®, for example, has a $\chi^2/N_{pt}$ value of 830, far greater than corresponding values of the nanoporous sol-gel ceramic of the present disclosure.

In an embodiment, the fractal aggregate model is a measure of scattering intensity, I, as a function of a scattering vector, q. In an embodiment, the fractal aggregate model is according to an equation:

$$I(q) = P(q)S(q) + \text{bck}$$

S(q) is a network or fractal structure that defines an organization or configuration of building blocks of the nanoporous sol-gel ceramic. Bck defines background scattering, such as from a scattering particle source and/or inelastic scattering of scattering particles off of the nanoporous sol-gel ceramic. In an embodiment, S(q) may be fined by the following equation:

$$S(q) = 1 + \frac{D_f \Gamma(D_f - 1)}{[1 + 1/q\xi)^2]^{(D_f - 1)/2}} \frac{\sin[(D_f - 1)\tan^{-1}(q\xi)]}{(qR_0)^{D_f}}$$

wherein
$R_0$ is a radius of the building blocks,
$\rho_{solvent}$ is a scattering length density of a solvent,
$\rho_{block}$ is a scattering length density of the building blocks,
$D_f$ is a fractal dimension,
$\xi$ is a correlation length, and
$\Gamma$ is the standard mathematical gamma function.

P(q) is a form factor that defines a structure of the building blocks of the nanoporous sol-gel ceramic as a function of q. Such form factors may take on a variety of shapes, such as simple geometric shapes like spheres, cubes, ovals, and the like.

In an embodiment, the building blocks are defined as homogeneous building blocks, such as homogeneous spheres. In that regard, in an embodiment, P(q) is defined by the following equation:

$$P(q) = \text{scale} \times V(\rho_{block} - \rho_{solvent})^2 F(qR_0)^2,$$

wherein $$F(x) = \frac{3[\sin(x) - x \cos(x)]}{x^3},$$

$$V = \frac{4}{3}\pi R_0^3,$$

scale is a volume fraction of building blocks of the measured nanoporous sol-gel ceramic, In an embodiment, the form factor defines a spherical core-shell building block.

In that regard, P(q) may be defined by the following formula:

$$P(q) = \frac{\text{scale}}{V_s} \left[ 3V_c(\rho_c - \rho_s) \frac{[\sin(qr_c) - qr_c \cos(qr_c)]}{(qr_c)^3} + 3V_s(\rho_s - \rho_{block}) \frac{[\sin(qr_s) - qr \cos(qr_s)]}{(qr_s)^3} \right]^2 + bkg$$

wherein
scale is a volume fraction of building blocks of the measured nanoporous sol-gel ceramic,
$V_c$ is a volume of the core,
$V_s$ is a volume of the shell,
$\rho_c$ is a scattering length density of the core,
$\rho_s$ is a scattering length density of the shell,
$\rho_{block}$ is a scattering length density of the building blocks,
$r_c$ is a radius of the core,
$r_s$ is a radius of the shell, and
bck is background scattering.

In an embodiment, one or more surfaces of the nanoporous sol-gel ceramic are coated with a coating. Such a coating can comprise a material selected from the group consisting of an alkyl group, a sulfonic acid, a carboxylic acid group, ammonium, and combinations thereof. A core-shell model, such as the core-shell fractal aggregate model may be suitable to characterize core-shell particle building blocks, such as ceramic particles coated with an alkyl or other hydrocarbon shell.

As above, various embodiments of the form factors, P(q), of the fractal aggregate models used to characterize small-angle scattering spectra include a factor including a difference between scattering length densities.

In an embodiment, scattering length densities in the above equations are defined by the materials that make up the components of the nanoporous sol-gel ceramic membranes. Generally, larger differences between scattering length densities of scattering sources, such as pores, and surrounding ceramic materials provide larger scattering contrast. Accordingly, in an embodiment, small-angle scattering data is generated from nanoporous sol-gel ceramics that have been dried to remove solvent or other liquid from the pores, thus providing a greater difference in scattering length densities compared to a nanoporous sol-gel ceramic with pores filled with a liquid solvent.

In an embodiment, the scattering length densities are defined in units of $\text{Å}^{-2}$ (inverse angstroms squared). The scattering length density is defined as the sum of the bound coherent scattering length of each atom normalized by the molecular volume. For example, the x-ray scattering length density of air is roughly $\text{Å}^{-2}$ while x-ray scattering length density of amorphous silica is roughly 18.8 $\text{Å}^{-2}$.

In an embodiment, small-angle scattering data is generated from nanoporous sol-gel ceramics that have been rinsed to remove residual ions, chemical reactants, and the like. In this regard, the small-angle scattering data is more representative of the nanoporous sol-gel ceramics and the pores it defines, rather than such a structure further including the residual ions.

In fitting small-angle scattering spectra to a fractal aggregate model includes fitting the small-angle scattering spectra over a range of q values that exceeds an order of magnitude, such as over an order of magnitude where q is in units of $\text{Å}^{-1}$. Such a relatively wide fitting range ensures that the data is fit to the fractal aggregate model over a range of sizes commensurate in scope with, for example, a size scale of pores of the nanoporous sol-gel ceramic, in addition to providing data sufficient to fit with the fractal aggregate model. In an embodiment, fitting small-angle scattering spectra to a fractal aggregate model includes fitting the small-angle scattering spectra over a range of q values in a range of about 0.01 Å$^{-1}$ to about 1 Å$^{-1}$. In an embodiment, fitting small-angle scattering spectra to a fractal aggregate model includes fitting the small-angle scattering spectra over a range of q values in a range of about 0.02 Å$^{-1}$ to about 0.8 Å$^{-1}$.

As above, scale corresponds to a volume fraction of pores in the nanoporous sol-gel ceramic. In embodiment, scale corresponds to membrane porosity when the small-angle scattering spectra are in intensity units of 1/cm and the scale is less than 0.7. In this regard, the scale corresponds to a number of pores, normalized by a size of the sample. In an embodiment, the nanoporous sol-gel ceramic has a porosity volume fraction in a range of about 0.01 to about 0.7. In an embodiment, the nanoporous sol-gel ceramic has a porosity volume fraction in a range of about 0.15 to about 0.35.

$D_f$ is a fractal dimension of some embodiments of the fractal aggregate models described herein. In an embodiment, $D_f$ corresponds to a shape and/or configuration of pores within the nanoporous sol-gel ceramic. Generally, $D_f$ is in a range of about 1 to about 3. Where $D_f$ is close to or at 1, the pores may be generally characterized as 1-dimensional tunnels. Where $D_f$ is close to or at 3, the pores may be generally characterized as open spheres.

In an embodiment, it is advantageous to have a nanoporous sol-gel ceramic defining pores having a tortuous or indirect route through the nanoporous sol-gel ceramic. For an ion or other particle in fluid communication with a tortuous pore, it is less likely that the ion or other particle will traverse the membrane as a size the ion or other particle approaches that of the tortuous pore than compared to a less tortuous pore. In that regard, such nanoporous sol-gel ceramics defining tortuous pores are suitable to provide, for example, more selective filtration than, for example, nanoporous sol-gel ceramics defining pores of the same size, but that provide a more direct path through the nanoporous sol-gel ceramic. In this regard, $D_f$ may be in a range of about 1.5 to about 2.5. In an embodiment $D_f$ is in a range of 1.8 to about 2.0. Such $D_f$ ranges describe or characterize nanoporous sol-gel ceramics having relatively tortuous pores having a form factor somewhere between a straight line and an open sphere.

In an embodiment, the fractal aggregate model is constrained to have pore sizes within a particular range. As above, the porous support defines pores that are greater than 10 nm. Likewise, in an embodiment, the pores of the nanoporous sol-gel ceramic are constrained to 10 nm or less. In an embodiment, the fractal aggregate model is constrained to have pore sizes or 5 nm or less. As discussed further herein, nanoporous sol-gel ceramics defining pores having average radii of less than, for example, 5 nm are generally suitable for use in ion exchange, filtration, flow batter membranes, and the like. Likewise, the methods described in the present disclosure are suitable to make such nanoporous sol-gel ceramics defining pores in such a size range. Accordingly, by constraining fractal aggregate models used to fit small-angle scattering data, a good fit between the fractal nanoporous sol-gel ceramic and the fractal aggregate model can be obtained.

As above, the correlation length, is a length over which the fractal pattern of the nanoporous sol-gel ceramic repeats itself. Higher-quality nanoporous sol-gel ceramics will repeat the fractal pattern over a relatively large size scale. In this regard, such higher-quality nanoporous sol-gel ceramics define regular, ordered pores over a relatively large size scale, which corresponds to improved functional properties, such as filtration, ion exchange, and the like. Analogously, a fractal pattern generally cannot extend to size scales smaller than a size scale of building blocks of the nanoporous sol-gel ceramic, such as smaller than molecules or atoms. Accordingly, in an embodiment, the correlation length, is constrained to a value of greater than 1 nm. In an embodiment, the correlation length, is constrained to a value of greater than 50 nm. In an embodiment, the correlation length, is constrained to a value of greater than 100 nm. In an embodiment, the correlation length, is constrained to a value of about a thickness of the nanoporous sol-gel ceramic. In an embodiment, the nanoporous sol-gel ceramics have a correlation length, greater than 1 nm, such as greater than 50 nm or greater than 100 nm.

The fractal aggregate models used to characterize the nanoporous sol-gel ceramics may include terms to account for variability in sizes of scattering sources, such as the pores of the nanoporous sol-gel ceramics. In that regard, in an embodiment, the fractal aggregate model includes a polydispersity ratio in a radius parameter. Accordingly, in an embodiment a radius of a building block, $R_0$, is a weighted average rather than a constant. The weighted average may be according to a number of mathematical functions, such a Gaussian function, a log-normal function, a rectangular distribution, and the like. In an embodiment, the polydispersity ratio is Gaussian and according to the equation:

$$f(x) = \frac{1}{Norm} \exp\left(-\frac{(x - x_{mean})^2}{2\sigma^2}\right)$$

wherein
$x_{mean}$ is a mean value of the distribution, and
Norm is a normalization factor determined during numerical calculation.

In an embodiment, the polydispersity ratio is lognormal and according to the equation:

$$f(x) = \frac{1}{Norm} \frac{1}{xp} \exp\left(-\frac{(\ln(x) - \mu)^2}{2p^2}\right)$$

wherein
$\mu = \ln(x_{med})$,
$x_{med}$ is a median value of the distribution, and
Norm is a normalization factor determined during numerical calculation.

In certain embodiment, lognormal distributions are advantageous as they are generally not symmetric about $x_{med}$. In this regard, as the polydispersity ratio increases, the lower tail may not fall into ranges that are aphysical, such as those which would define a pore size smaller than, for example, atoms, etc. that physically define the pores.

In an embodiment, the polydispersity ratio is constrained to less than 0.7. Polydispersities greater than, for example, 0.7 would define a high polydispersity characterizing a nanoporous sol-gel ceramic defining pores of highly disperse and variable diameters. In an embodiment, a polydispersity ratio is in a range of about 0.1 to about 0.4. In an embodiment, a polydispersity ratio is in a range of about 0.1 to about 0.2.

As above, the nanoporous sol-gel ceramics can include any of the nanoporous sol-gel ceramics described herein. In an embodiment, the nanoporous sol-gel ceramic comprises greater than 20 mole % oxygen and greater than 10 mole % inorganic molecules. In an embodiment, the nanoporous sol-gel ceramic comprises oxygen in a range of about 20 mole % to about 80 mole %. In an embodiment, the nanoporous sol-gel ceramic comprises oxygen in a range of about 10 mole % to about 33.3 mole %. In an embodiment, the nanoporous sol-gel ceramic comprises a material selected from the group consisting of silica, alumina, titania, germania, zirconia, and combinations thereof.

Selective-Membrane Structures

In another aspect, the present disclosure provides a selective-membrane structure, comprising a plurality of individual selective membranes. In an embodiment, the individual selective membranes are joined by a support member in a planar configuration to allow fluid flow therethrough.

In an embodiment, the individual selective membrane defines one or more pores. In an embodiment, the individual selective membrane comprises a porous material. In an embodiment, the porous material includes a polymeric material that defines one or more pores. Such a porous polymeric material can include polymers of intrinsic porosity (PIM). In an embodiment, the porous material defines one or more pores having an average diameter in a range of about 5 nm to about 1,000 nm. In an embodiment, the porous material defines one or more pores having an average diameter in a range of about 1 micron to about 100 microns. In an embodiment, the porous material includes a sol-gel assembled material, such as a sol-gel assembled polymer, a sol-gel assembled metal, and the like. In an embodiment, the porous material includes poly(tetrafluoroethylene) (PTFE), such as porous PTFE and expanded PTFE. In an embodiment, the porous material includes a porous polyethylene. In an embodiment, the porous material includes a porous poly(vinylidene fluoride) (PVDF).

As above, in certain embodiment, non-sintered and non-calcinated ceramic-containing membranes are brittle. Configuring such membranes in a grid-like structure, as described with respect to the present aspect, solves an important problem associated with the brittleness of large-area, non-sintered, and non-calcinated ceramic-containing membranes. By creating smaller discrete ceramic-containing membranes, which can be combined in a grid structure, it is possible to create a large-area membrane that is flexible due to the support structure, including for example a polymer linkage between ceramic cells. Further, the active area of the ceramic may be increased by adding additional cells.

The individual selective membranes can include any of the nanoporous selective sol-gel ceramic membrane of the present disclosure. In that regard, in an embodiment, the individual selective membranes can include a nanoporous composite comprising a nanoporous sol-gel ceramic composite filling at least a portion of a porous support, wherein the nanoporous composite comprises a plurality of nanopores of 5 nm or smaller in radius with a polydispersity index of 0.5 or lower. In an embodiment, the individual selective membranes can include a nanoporous composite comprising a nanoporous sol-gel ceramic composite filling an active area of the porous support; wherein the nanoporous sol-gel ceramic has a fractal nanoporous structure as determined by fitting small-angle scattering spectra of the nanoporous sol-gel ceramic to a mathematical model.

In an embodiment, the individual selective membrane comprises a material selected from the group consisting of graphene, graphene oxide, and combinations thereof. In an embodiment, such materials define apertures, such as molecule-sized holes. In an embodiment, the apertures are formed by puncturing the graphene and/or graphene oxide using ions to create a nanoporous membrane structure.

In an embodiment, the individual selective membranes comprise graphene, graphene oxide, or combinations thereof where such materials are in the form of a single atomic layer or sheet of graphene or graphene oxide. In an embodiment, the individual selective membranes comprise graphene, graphene oxide, or combinations thereof in the form of stacked atomic layers or sheets of graphene or graphene oxide.

In an embodiment, one or more of the individual selective membranes comprises graphene, such as graphene filling at least a portion of a porous support having a plurality of pores that are 10 nm or greater in diameter. While graphene is suitable for use, for example, as a filtration membrane, it generally does not have sufficient structural characteristics to act as a stand-alone filter. However, when individual selective membranes comprising graphene are joined to and supported by a support member, such graphene-containing individual selective membranes are suitable to withstand greater stress than without the support member. In this regard, a selective-membrane structure comprising graphene-containing individual selective membranes is suitable, for example, to selectively filter components of a fluid in contact with the graphene-containing individual selective membranes.

In an embodiment, the individual selective membranes comprise an ion-exchange material, such as Nafion®. In an embodiment, ion-exchange material fills at least a portion of a porous support structure. In an embodiment, such an ion-exchange material is incorporated into the selective-membrane structure, such as by infiltrating the porous support structure, after support members have been coupled to the porous support structure.

Figure 30A:
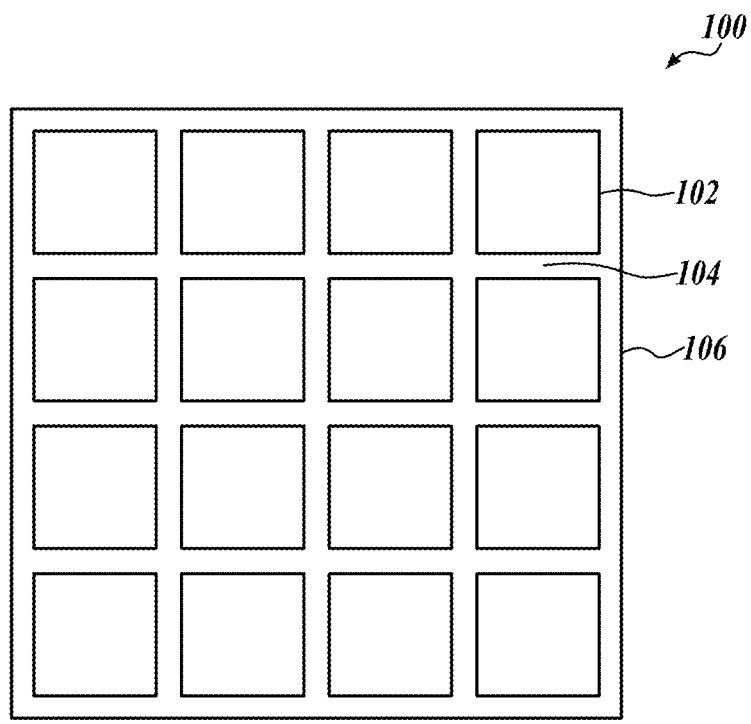
FIG. 30A schematically illustrates a selective-membrane structure, in accordance with an embodiment of the disclosure.

FIG. 30A schematically illustrates a selective-membrane structure 100, in accordance with an embodiment of the disclosure. As shown, selective-membrane structure 100 is shown to include a plurality of individual selective membranes 102 joined in a planar configuration by a support structure 106. In the illustrated embodiment, the support structure 106 includes a plurality of support members 104 disposed adjacent to side edges of individual selective members 102. In this regard, the plurality of support members 104 overlaps at least a portion of the plurality of individual selective membranes 102. As shown, the support members 104 are disposed in a grid configuration to define a plurality of apertures into which the individual selective membranes 102 are disposed.

Figure 26:
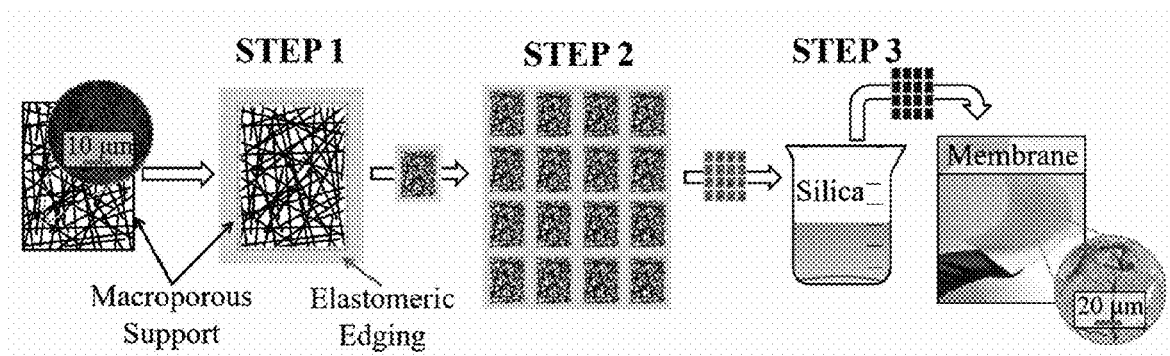
FIG. 26 is a schematic illustration of a method for preparing a large grid-like membrane structure comprised of single smaller membranes, in accordance with an embodiment of the disclosure.
Figure 27:
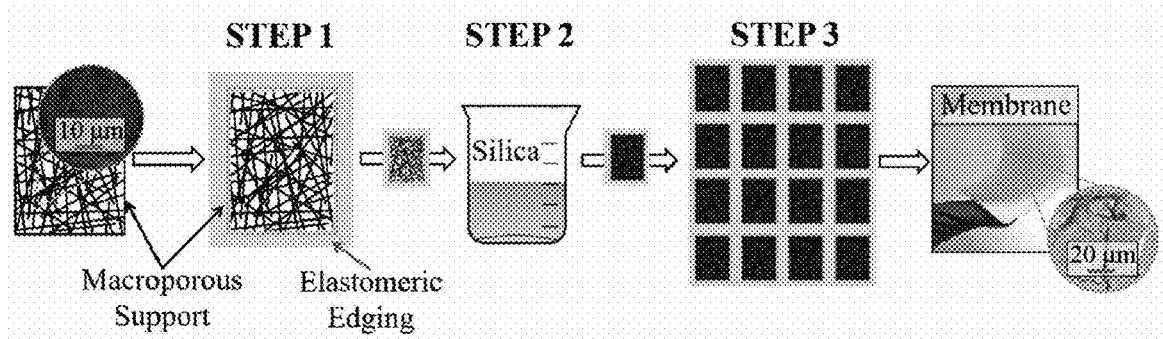
FIG. 27 is a schematic illustration of a method for preparing a large grid-like membrane structure comprised of single smaller membranes, in accordance with an embodiment of the disclosure. Step 1: Apply edging. Step 2: Make membrane. Step 3: Make membrane grid.
Figure 28:
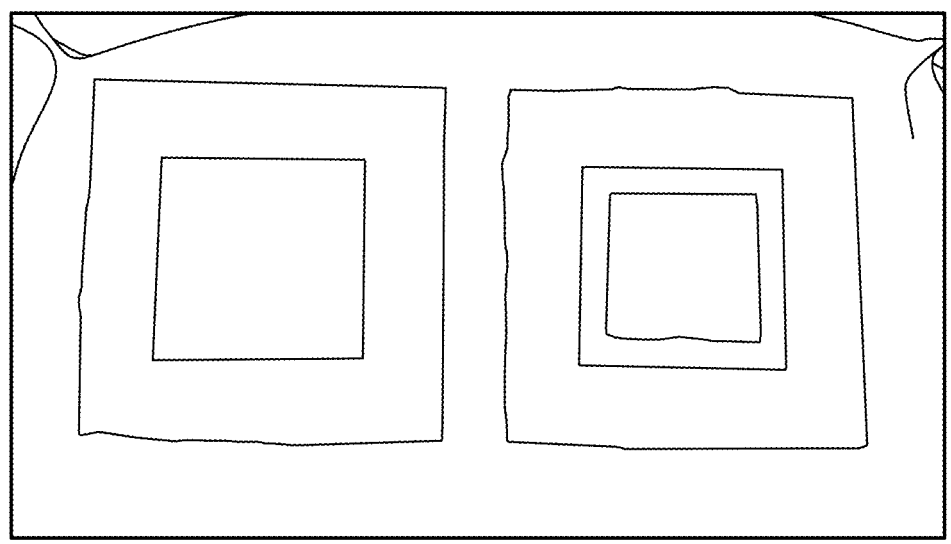
FIG. 28 is a photograph of 2 smaller membranes (250 $cm^2$ each), in accordance with an embodiment of the disclosure, suitable for use as a part of a grid structure.
Figure 29:
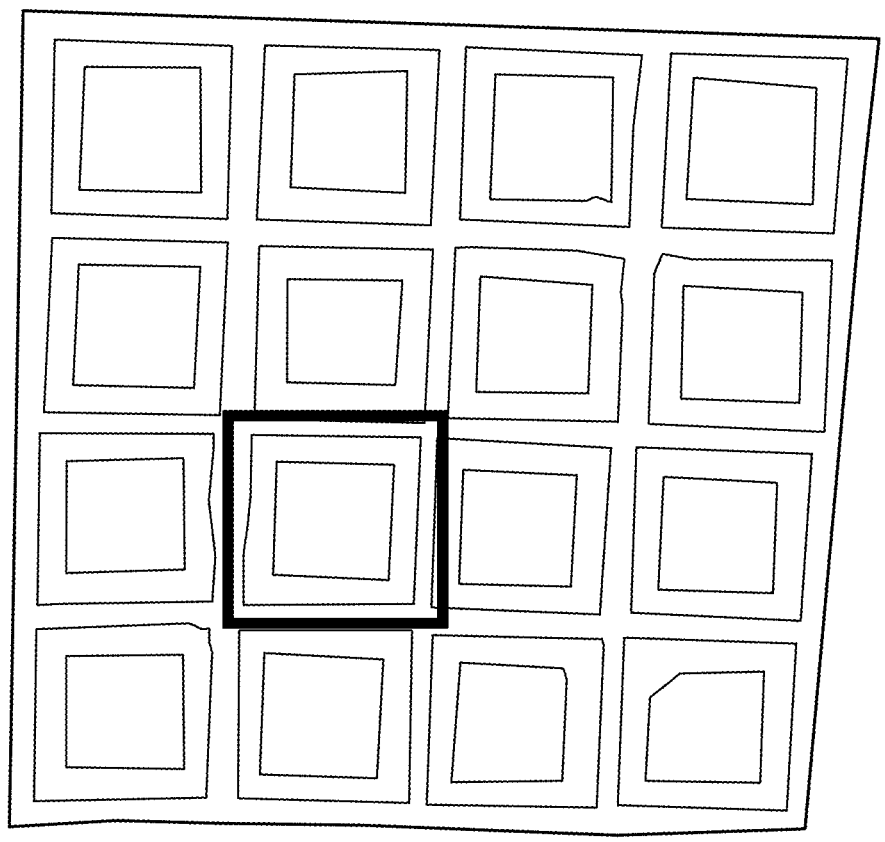
FIG. 29 is a photograph of a selective-membrane structure (4000 $cm^2$) composed of smaller membranes (250 $cm^2$ each, box), in accordance with an embodiment of the disclosure.

In an embodiment, the individual selective membranes 102 include an edging material (not shown, see for example FIGS. 26 and 27) disposed about an outer edge of the individual selective membranes 102. Such an edging material can include an elastic and/or compressible material. The edging material is suitable to join the individual selective membranes 102 to one another along the outer edges. As shown, the selective-membrane structure 100 further includes the support structure 106, which may be configured to compress the edging material to hold the plurality of individual selective membranes 102 together in the grid configuration. In this regard, the grid-like structure is configured to provide a liquid-tight seal such that liquid does not flow between the individual selective membranes 102. Rather, the selective-membrane structure 100 is configured to allow fluid to flow though the individual selective membranes 102, such as to filter the fluid or allow ion transport therethrough.

The edging material may be polymeric, such as made from a compressible polymer. The edging material of one individual selective membrane 102 may be coupled to an edging material of another individual selective membrane 102 by a method selected from the group consisting of heating the edging materials, exposing the edging materials to a solvent, radiation of the edging material, and combinations thereof.

In an embodiment, the edging material includes a compressible polymer and a compressible thermoplastic elastomer.

In an embodiment, the support structure 106 is flexible and, therefore, able to absorb stresses on the selective-membrane structure 100, such as during use in filtration, ion exchange, and the like, as fluid is flowed across the selective membrane structure 100. In this regard, the support structure 106 is configured to bend, deflect, compress, deform and the like as stress is applied to the selective-membrane structure 100. Such stress absorption reduces stress on nanoporous sol-gel ceramics of the individual selective membranes 102. As discussed further herein, such nanoporous sol-gel ceramics can be rigid or brittle. By reducing stress on the nanoporous sol-gel ceramics, they are less likely to break, thereby increasing a lifetime of the selective-membrane structure 100 and/or increasing breaking points of the selective-membrane structure 100.

In an embodiment, the support structure 106 is polymeric. In an embodiment, the support structure 106 comprises a material selected from the group consisting of epoxy, polyurethane, poly(styrene-isoprene-styrene), poly(styrene-isobutylene-styrene), polypropylene, polyethylene, polyvinyl chloride, polystyrene, polyamide, polyimide, polyacetonitrile, polyvinylacetate, polyethylene glycol, poly ether ether ketone, polysulfone, polyacrylamide, polydimethylsiloxane, polyvinylidene fluoride, polyacrylic acid, polyvinyl alcohol, polyphenylene sulfide, polytetrafluoroethylene, cellulose and its derivatives, and combinations thereof.

In an embodiment, the support structure 106 including the support members 104 includes an ion-exchange material. In this regard, the support structure 106 contributes to a functional area of the selective membrane structure 100. The support structure 106 can include materials functional to perform tasks other than or in addition to ion-exchange, such as those suitable for filtration, redox flow cell batteries, electro-dialysis, dead-end filtration, pharmaceutic filtration, lithium ion batteries, reverse osmosis water purification, waste water treatment, food processing, textiles, and the like.

Figure 30B:
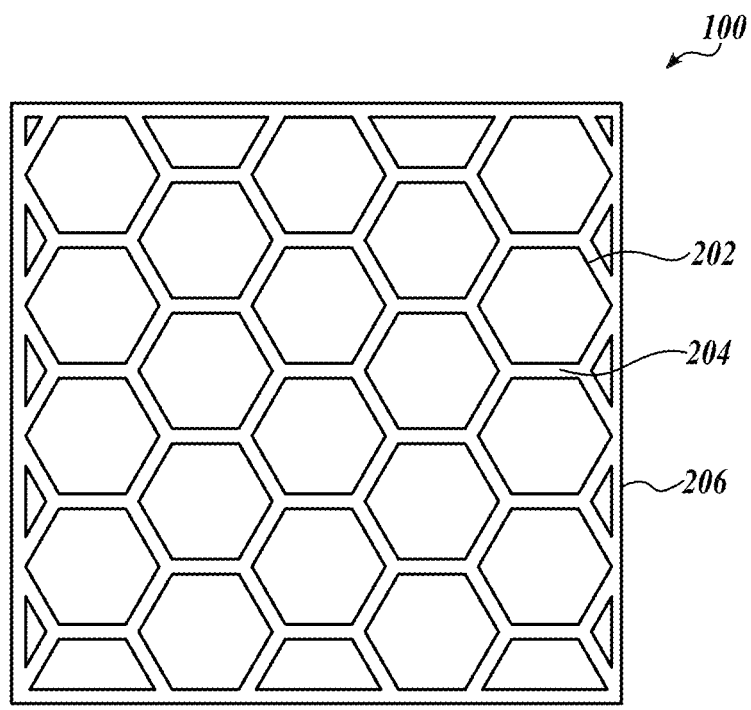
FIG. 30B schematically illustrates another selective-membrane structure, in accordance with an embodiment of the disclosure.

As above, the support members can be disposed in a grid configuration to define a plurality of apertures into which the individual selective membranes are disposed. As illustrated in FIG. 30A, the grid is a square grid defining square active areas. While square active areas and a square grid are illustrated, it will be understood that other grid configurations are possible, such as regular tessellating polygons, irregular shapes, circles, and the like. In that regard, attention is directed to FIG. 30B, in which another selective-membrane structure 200 is illustrated.

As shown, the selective-membrane structure 200 includes a plurality of individual selective membranes 202 joined in a planar configuration to allow fluid flow therethrough. In that regard, the selective-membrane structure 200 includes a support structure 206 including a plurality of support members 204 coupling the individual selective membranes together. In the illustrated embodiment, the individual selective membranes 202 are disposed in a tessellated hexagonal configuration.

Such a configuration may be suitable to increase an active membrane surface area of the selective-membrane structure 202. In an embodiment, an active membrane surface area of the selective-membrane structure including the plurality of individual selective membranes is greater than 50% of a total surface area of the selective-membrane structure. In an embodiment, the active membrane surface area of the selective-membrane structure including the plurality of individual selective membranes is in a range of about 50% to about 95%. Various configurations of individual selective membranes 202 may be combined with functional support structure 206 materials, as discussed further herein with respect to FIG. 30A, to further increase an active membrane surface area.

In an embodiment, the selective-membrane structures of the present disclosure include a support structure is disposed underneath the nanoporous composite comprising a nanoporous sol-gel ceramic composite. Such a support structure can be, for example, coupled to the porous support and the nanoporous composite is formed over the porous support and the support structure. In such a configuration, with the support structure disposed underneath at least a portion of the nanoporous composite, the support structure forms an endoskeleton for the nanoporous composite. In this regard, the support structure provides physical support to the nanoporous composite to reduce stresses applied to the selective membrane structure, as discussed further herein with respect to FIGS. 30A and 30B.

The materials of such an endoskeletal support structure can include those support structure materials described further herein. In this regard, the endoskeletal support structure may be flexible and/or compressible. In an embodiment, the endoskeletal support structure is disposed in a grid configuration defining one or more apertures to allow fluid flow through the nanoporous composite.

While each of the elements of the present invention is described herein as containing multiple embodiments, it should be understood that, unless indicated otherwise, each of the embodiments of a given element of the present invention is capable of being used with each of the embodiments of the other elements of the present invention and each such use is intended to form a distinct embodiment of the present invention.

The referenced patents, patent applications, and scientific literature referred to herein are hereby incorporated by reference in their entirety as if each individual publication, patent or patent application were specifically and individually indicated to be incorporated by reference. Any conflict between any reference cited herein and the specific teachings of this specification shall be resolved in favor of the latter. Likewise, any conflict between an art-understood definition of a word or phrase and a definition of the word or phrase as specifically taught in this specification shall be resolved in favor of the latter.

As can be appreciated from the disclosure above, the present invention has a wide variety of applications. The invention is further illustrated by the following examples, which are only illustrative and are not intended to limit the definition and scope of the invention in any way.

EXAMPLES

Example 1

In this example, methods of structural characterization of the nanoporous selective sol-gel ceramic membranes are described.

Membrane Permeability

Figure 4:
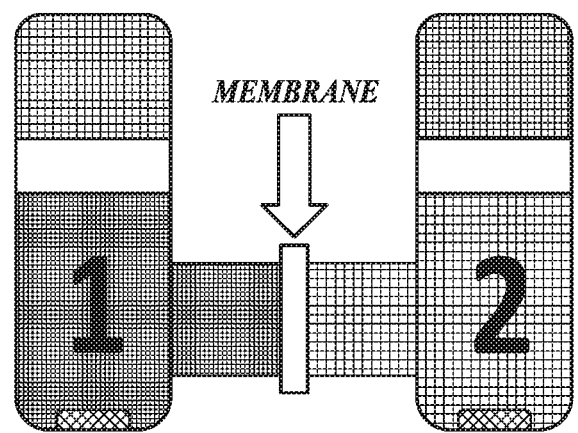
FIG. 4 is a schematic illustration of an H-Cell setup with $CrCl_3$ on side 1 and $AlCl_3$ on side 2 or $VOSO_4$ on side 1 and $MgSO_4$ on side 2.

To measure ion diffusion across the membrane, the basic H-cell setup was utilized (FIG. 4). The left side of the cell contained 10 mL of 1M $FeCl_3$ or 1M $CrCl_3$, both in 3 M HCl OR 1 M $VOSO_4$ in 2.5 M or $H_2SO_4$. The right side contained 10 mL of 1 M $AlCl_3$ or $MgSO_4$ to balance out the osmotic pressure and ionic strength. As the ions began to diffuse across the membrane, 1 mL from the permeate side was extracted and placed into a cuvette, with the date and time of extraction recorded. Then, 1 mL of fresh $AlCl_3$ or $MgSO_4$ solution was placed back into the permeate side. After the collection of sufficient samples, a Thermo Scientific Evolution 300 UV Vis Spectrophotometer was used to measure the absorbance of each sample and consequently calculate the concentration using Beer's law below, where Abs is the absorbance, E is the extinction coefficient of the $FeCl_3$, $CrCl_3$, or $VOSO_4$ solution, l is the path length of light that travels through the cuvette, and c is the concentration.

$$\text{Beer's Law: Abs} = \varepsilon l c \quad (1)$$

The concentration of the ions is plotted against time, and fit to the concentration profile obtained in the H-Cell using a pseudo-steady diffusion approximation Once the value for the diffusion process time ($t_p$) is obtained, the extrinsic permeability is obtained using equation 3, where A is the area of the membrane and V is the volume of solution in the cell.

$$C(t) \frac{C_0}{2} \left(1 = e^{-\frac{t}{t_p}}\right) \quad (2)$$

$$P = \frac{t_p * V}{2A} \quad (3)$$

Area Specific Resistance (ASR)

Figure 5:
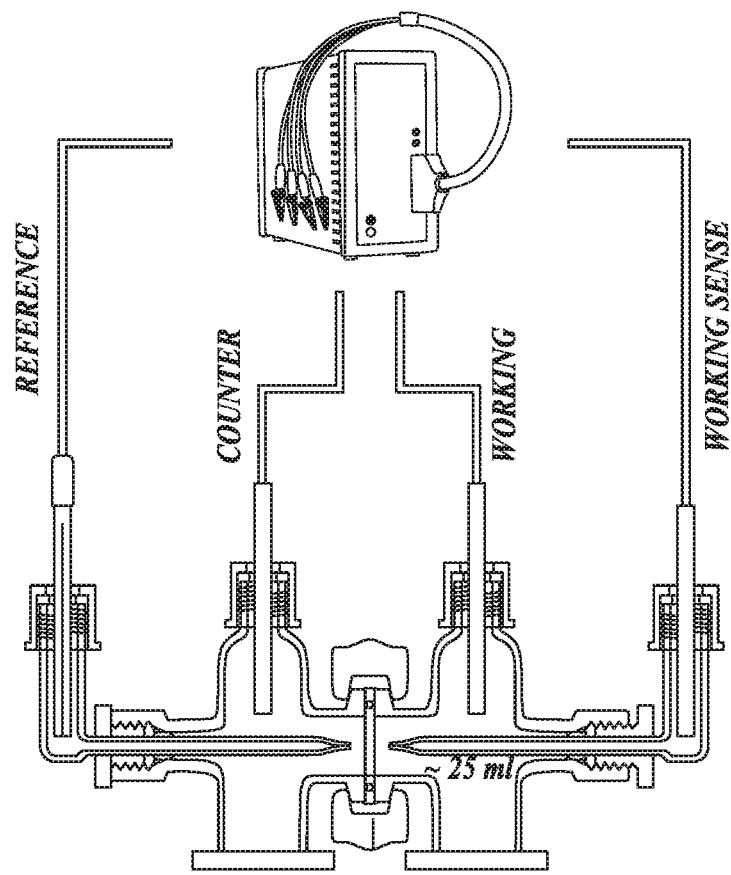
FIG. 5 is a schematic illustration of a 4-electrode PEIS setup.

FIG. 5 shows a schematic of the setup utilized to measure ASR by 4-electrode potentiostatic electrochemical impedance spectroscopy (PEIS). The instrumentation used was a Gamry Reference 600 Potentiostat. The setup consists of a modified H-cell with Luggin capillaries. The volume inside the cell holds 50 mL. An AC potential of 5 mV was applied at a frequency of 10-1,000,000 Hz. A small AC potential excitation (1-10 mV) is common in the literature to maintain pseudo-linearity of the system.

Structural Characterization

Small angle x-ray scattering (SAXS) was utilized to characterize the nanostructure of the sol-gel ceramic composite membranes. SAXS techniques have been extensively used in the literature to investigate the nanostructure of sol-gel materials. SAXS measurements were performed using an Anton Paar SAXess instrument in slit collimation. Data corrections for background (e.g., quartz capillary) are applied when necessary and data is put in absolute scale using a high density polyethylene (HDPE) standard as described by Fan and coworkers (Fan, M. Degen, S. Bendle, N. Grupido, J. Ilaysky, The absolute calibration of a small angle scattering source instrument with a laboratory x-ray source, *J. Phys: Conf. Series*, 247 (2010), 012005).

Example 2

In this Example, four variations of exemplary membranes were prepared as follows.

PSS Teos Silica Membrane

This membrane was processed using the method described in FIG. 1. For step 1, a non-woven silica macroporous substrate (1 μm nominal pore size, 330 μm thickness, 70% porosity) was used in combination with a SIBS polymer edging (Kraton D1170). The SIBS was 400 μm thick and had a 2 mm overlap region with macroporous support and a 9 mm non-overlapping region in which the SIBS on either side of the support could seal to itself. SIBS was melted into the macroporous support using a heat press with pressure <100 kPa and temperatures between 300° F.-400° F. for times of 1-10 minutes. This ensured sufficient infiltration of the SIBS polymer into the macroporous support. To further ensure a complete seal, 50 μL of toluene was dropped onto the boundary region of the macroporous support and polymer edging. For step 2, a sol-gel solution containing a 1:1 volume ratio of 98 weight % tetraethyl orthosilicate (TEOS) and 18 weight % polystyrene sulfonic acid in water (PSS) was prepared. The edged supports from step 1 were soaked in the sol-gel solution for 15 minutes and subsequently removed. After this, they were allowed to dry as an optional $3^{rd}$ step in order to induce gelation (i.e., self-assembly) and remove as much of the liquid content from the membrane (i.e., condensation/evaporation). Membranes were dried for 12-24 hours at ambient pressure and temperature (i.e., 1 atm and ~23° C.) on a teflon plate.

SS Teos Silica Membrane

This membrane was processed using the method described in FIG. 2. For step 1, a non-woven silica macroporous substrate (1 μm nominal pore size, 150 μm thickness, 75% porosity) was used in combination with a SIBS polymer edging (Kraton D1170). The SIBS was 400 μm thick and had a 2 mm overlap region with macroporous support and a 9 mm non-overlapping region in which the SIBS on either side of the support could seal to itself. SIBS was melted into the macroporous support using a heat press with pressure <100 kPa and temperatures between 300° F.-400° F. for times of 1-10 minutes. This ensured sufficient infiltration of the SIBS polymer into the macroporous support. To further ensure a complete seal, 50 μL of toluene was dropped onto the boundary region of the macroporous support and polymer edging. For step 2, the edged macroporous support was soaked into a 27% sodium silicate (SS) solution in water for 15 minutes. The SS aids in fully filling the substrate. For step 3, 40 μL of a sol-gel solution containing 98 weight % tetraethyl orthosilicate was dropcasted onto the SS infiltrated substrate. The 40 μL was enough to cover the entire unedged portion of the substrate. After the sol-gel coating, membranes were allowed to dry as an optional $4^{th}$ step in order to induce gelation (i.e., self-assembly) and remove as much of the liquid content from the membrane (i.e., condensation/evaporation). Membranes were dried for 12-24 hours at ambient pressure and temperature (i.e., 1 atm and ~23° C.) on a teflon plate.

SS Teos Cellulose Membrane

This membrane was processed using the method described in FIG. 2. For step 1, a non-woven cellulose macroporous substrate 1 μm, 190 μm thickness, 75% porosity) was used in combination with a SIBS polymer edging (Kraton D1170). The SIBS was 400 μm thick and had a 2 mm overlap region with macroporous support and a 9 mm non-overlapping region in which the SIBS on either side of the support could seal to itself. SIBS was melted into the macroporous support using a heat press with pressure <100 kPa and temperatures between 300° F.-400° F. for times of 1-10 minutes. This ensured sufficient infiltration of the SIBS polymer into the macroporous support. To further ensure a complete seal, 50 μL of toluene was dropped onto the boundary region of the macroporous support and polymer edging. For step 2, the edged macroporous support was soaked into a 27% sodium silicate (SS) solution in water for 15 minutes. The SS aids in fully filling the substrate. For step 3, 40 µL of a sol-gel solution containing 98 weight % tetraethyl orthosilicate was drop-casted onto the SS infiltrated substrate. The 40 µL was enough to cover the entire unedged portion of the substrate. After the sol-gel coating, membranes were allowed to dry as an optional $4^{th}$ step in order to induce gelation (i.e., self-assembly) and remove as much of the liquid content from the membrane (i.e., condensation/evaporation). Membranes were dried for 12-24 hours at ambient pressure and temperature (i.e., 1 atm and ~23° C.) on a teflon plate.

SS PSS Teos Silica Membrane

This membrane was processed using the method described in FIG. 2. For step 1, a non-woven silica macroporous substrate (1 µm nominal pore size, 330 µm thickness, 70% porosity) was used in combination with a SIBS polymer edging (Kraton D1170). The SIBS was 400 µm thick and had a 2 mm overlap region with macroporous support and a 9 mm non-overlapping region in which the SIBS on either side of the support could seal to itself. SIBS was melted into the macroporous support using a heat press with pressure <100 kPa and temperatures between 300° F.-400° F. for times of 1-10 minutes. This ensured sufficient infiltration of the SIBS polymer into the macroporous support. To further ensure a complete seal, 50 µL of toluene was dropped onto the boundary region of the macroporous support and polymer edging. For step 2, the edged macroporous support was soaked into a 27% sodium silicate (SS) solution in water for 15 minutes. The SS aids in fully filling the substrate. For step 3, a sol-gel solution containing a 1:1 volume ratio of 98 weight % tetraethyl orthosilicate (TEOS) and 18 weight % polystyrene sulfonic acid in water (PSS) was prepared. The SS infiltrated substrates from step 2 were soaked in the sol-gel solution for 15 minutes and subsequently removed. After the sol-gel coating, membranes were allowed to dry as an optional $4^{th}$ step in order to induce gelation (i.e., self-assembly) and remove as much of the liquid content from the membrane (i.e., condensation/evaporation). Membranes were dried for 12-24 hours at ambient pressure and temperature (i.e., 1 atm and ~23° C.) on a teflon plate.

Figure 6:
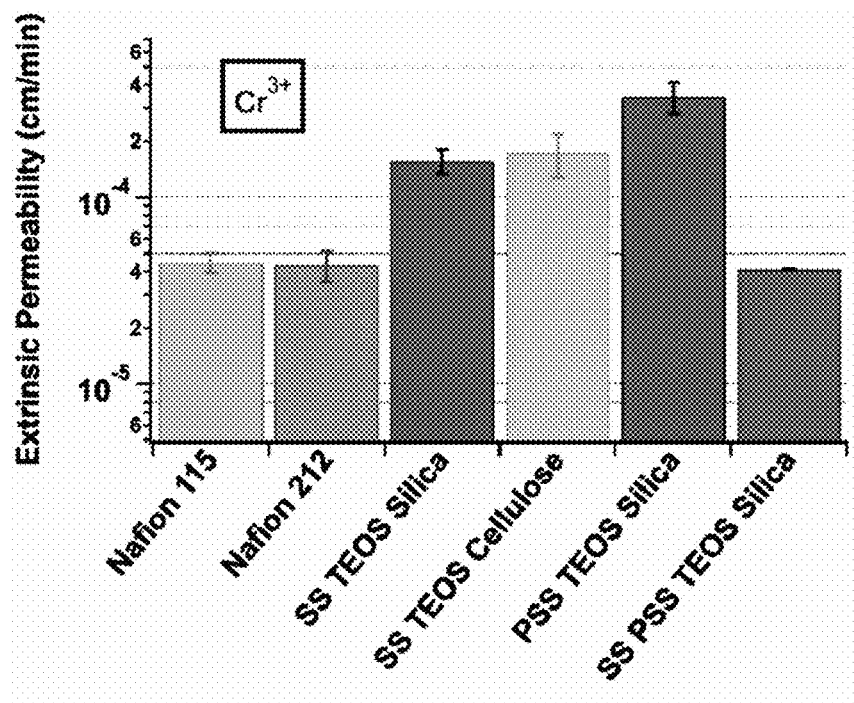
FIG. 6 is a graph of extrinsic permeability of $Cr^{3+}$ ions through Nafion® membranes and nanoporous selective sol-gel ceramic composite membranes, in accordance with an embodiment of the disclosure.
Figure 7:
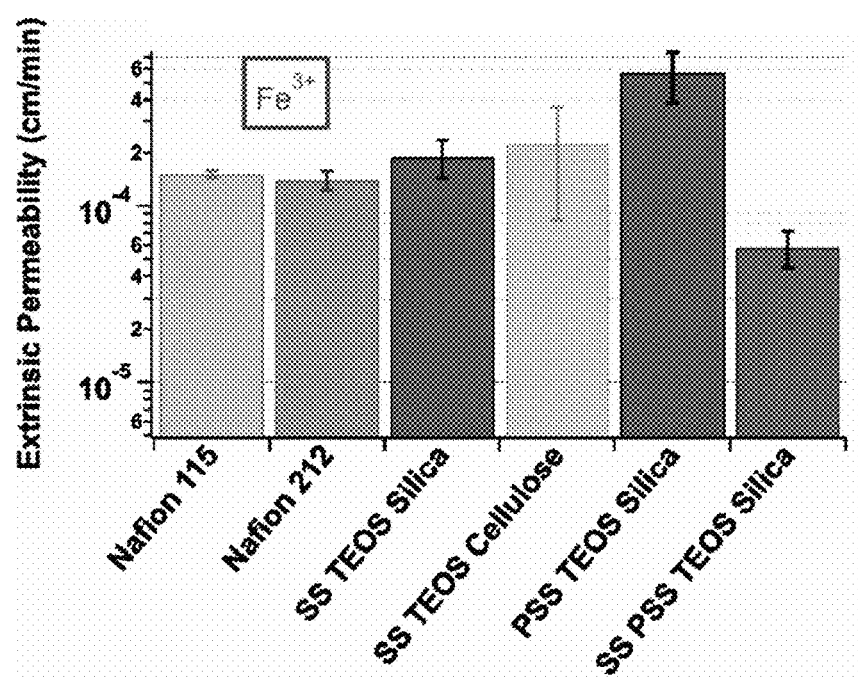
FIG. 7 is a graph of extrinsic permeability of $Fe^{3+}$ ions through Nafion® membranes and nanoporous selective sol-gel ceramic composite membranes, in accordance with an embodiment of the disclosure.

The exemplary membranes were characterized as follows. FIGS. 6 and 7 show extrinsic permeabilities of the exemplary membranes for $Cr^{3+}$ and $Fe^{3+}$ ions. It should be noted that a lower permeability is desired for the membranes. Two of the most common types of perflourosulfonic membranes commonly used in industry, Nafion® 115 and 212, served as a benchmark for the exemplary sol-gel ceramic composite membranes. The PSS TEOS Silica membrane processed according to FIG. 1 had the highest permeability. Next, the SS TEOS Silica and Cellulose membranes, processed according to FIG. 2, had the next highest permeabilities. There was not a significant difference between these two membranes based on the variation between the silica based and cellulose based macroprous supports. However, it makes sense that the cellulose membranes had a slightly higher permeability compared to those with silica paper, due to the fact that the cellulose paper is less dense and thinner. Interestingly, the SS PSS TEOS Silica membrane, processed again according to FIG. 2, achieved the lowest permeability amongst the sol-gel ceramic composite membranes. Even more noteworthy, this membrane formulation was able to match and reduce the $Cr^{3+}$ and $Fe^{3+}$ permeabilities, respectively, of both Nafion® membranes. This is believed to be due to the benefits of both the PSS catalyst and the dense SS solution present in the same membrane. It should also be mentioned that these are very small ions permeating through the membranes. While the SS TEOS Silica/Cellulose and PSS TEOS Silica membranes did not perform as well for this specific purpose (i.e., ICRFB), they should not be discarded for other types of battery membranes or filtration purposes that use larger molecules. These indeed could also serve to be a great option.

Figure 8:
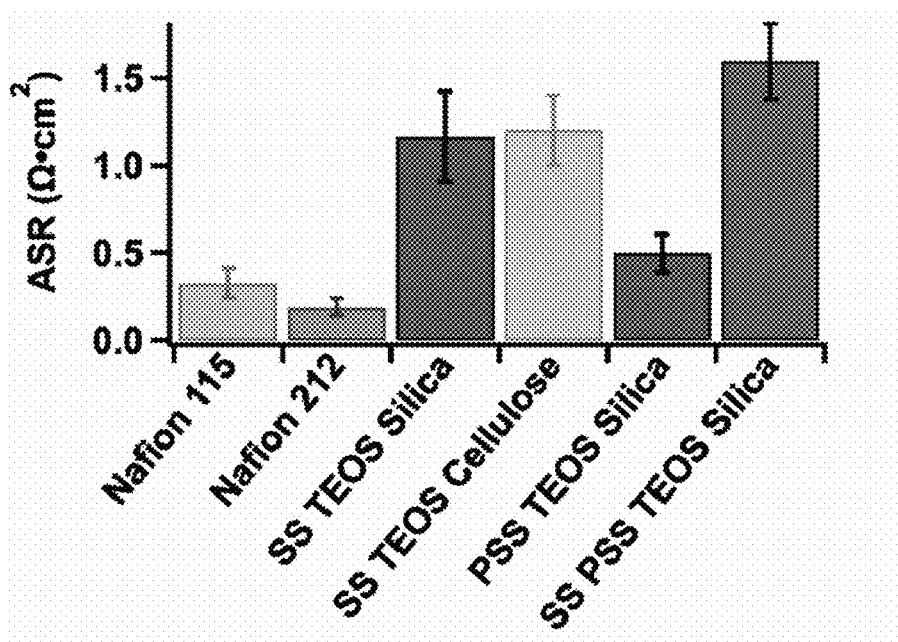
FIG. 8 is a graph of area specific resistance (ASR) of Nafion® membranes and nanoporous selective sol-gel ceramic composite membranes, in accordance with an embodiment of the disclosure.

The area specific resistance (ASR) was calculated for these membranes. After performing potentiostatic electrochemical impedance spectroscopy (PEIS), the resistance of the membrane can be trivially found by subtracting the resistance of the cell with the membrane ($R_1$) from the resistance of the cell without a membrane ($R_0$), and finally multiplying by the cross-sectional area of the membrane (A). The results are seen below in FIG. 8. Not surprisingly, the Nafion® membranes possessed the lowest ASR, as this is a quality for which it is highly revered and is a large reason why it is so popular despite its high cost.

$$ASR=(R1-Ro)*A \tag{4}$$

Figure 9:
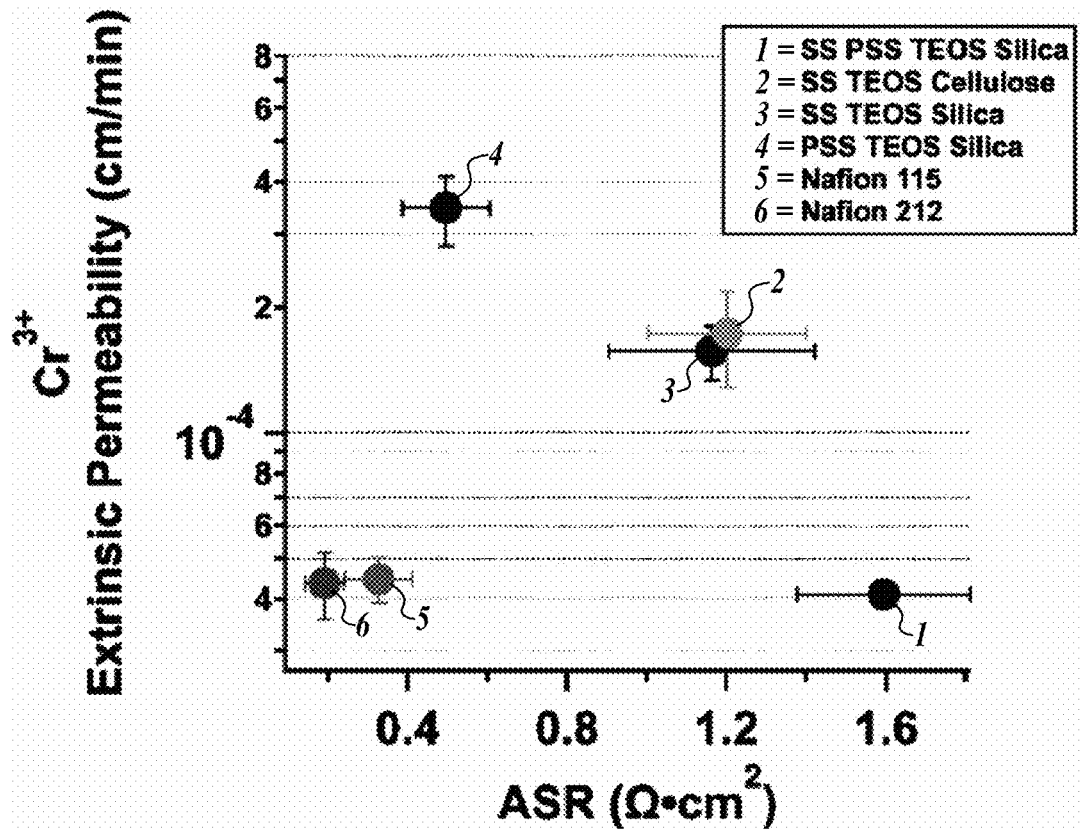
FIG. 9 is a plot of ASR vs extrinsic permeability of $Cr^{3+}$ ions for Nafion® membranes and nanoporous selective sol-gel ceramic composite membranes, in accordance with an embodiment of the disclosure.
Figure 10:
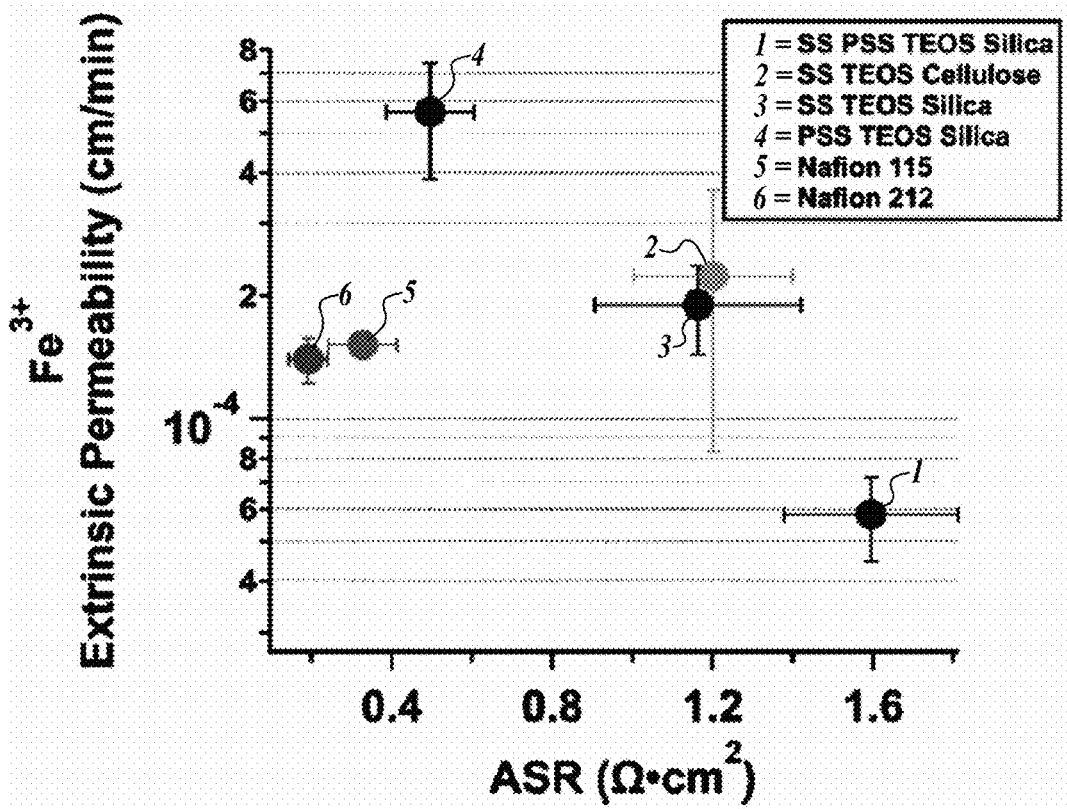
FIG. 10 is a plot of ASR vs extrinsic permeability of $Fe^{3+}$ ions for Nafion® membranes and nanoporous selective sol-gel ceramic composite membranes, in accordance with an embodiment of the disclosure.

The ASR of the sol-gel ceramic composite membranes were all higher than Nafion®. In addition, a well-known hurdle in membrane manufacturing is the relationship between the ASR and permeability. In general, membranes with lower permeabilities will generally have higher ASR and vice-versa. This can be seen explicitly in FIG. 8 where the SS PSS TEOS Silica membrane had the highest ASR, whereas previously it was seen that it possessed the lowest permeability. The other sol-gel ceramic composite membranes followed a similar trend. This trend is highlighted further in FIGS. 9 and 10 where the extrinsic permeability is plotted against the ASR of these membranes.

An inverse relationship between the ASR and permeability of the sol gel ceramic composite membranes can be noticed. It should be mentioned however that an ASR of 1 $cm^2$ is deemed an acceptable value for the ICRFB. It is desirable to have as low of an ASR as possible and this can be achieved with further modifications and selections of precursors for this sol gel process.

Figure 11:
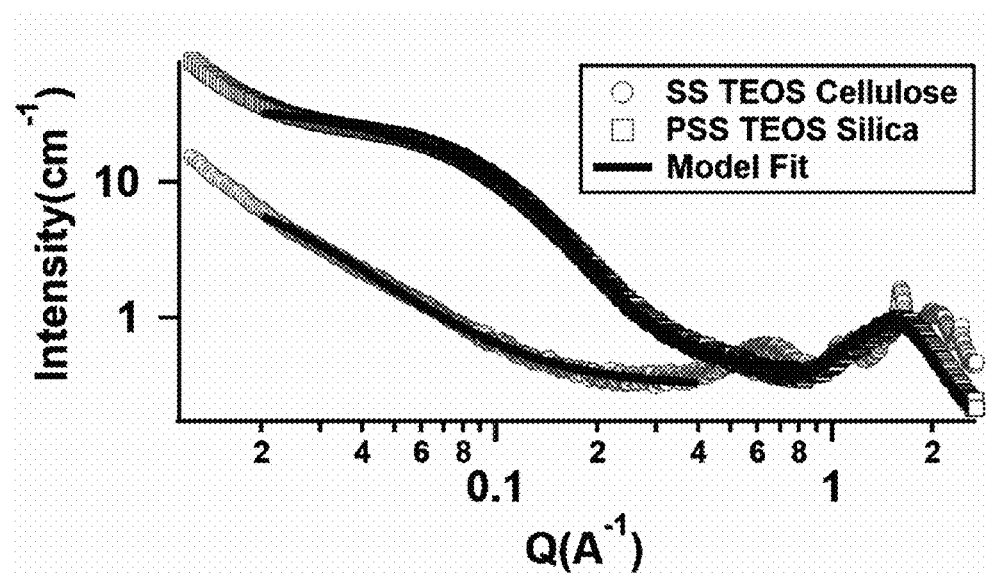
FIG. 11 shows small-angle x-ray scattering (SAXS) profiles of nanoporous selective sol-gel ceramic composite membranes, in accordance with an embodiment of the disclosure.
Figure 12:
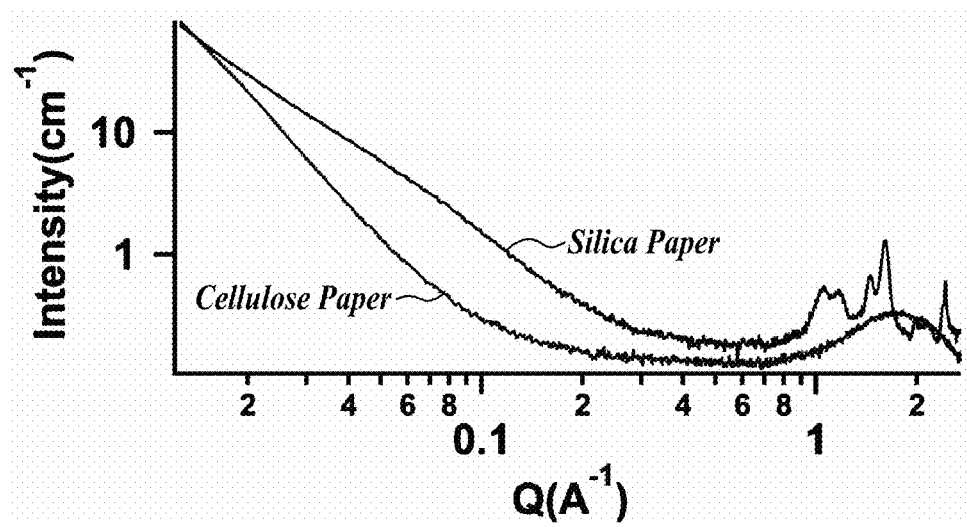
FIG. 12 shows SAXS profiles of silica and cellulose porous supports used in the preparation of nanoporous selective sol-gel ceramic composite membranes, in accordance with an embodiment of the disclosure.
Figure 13:
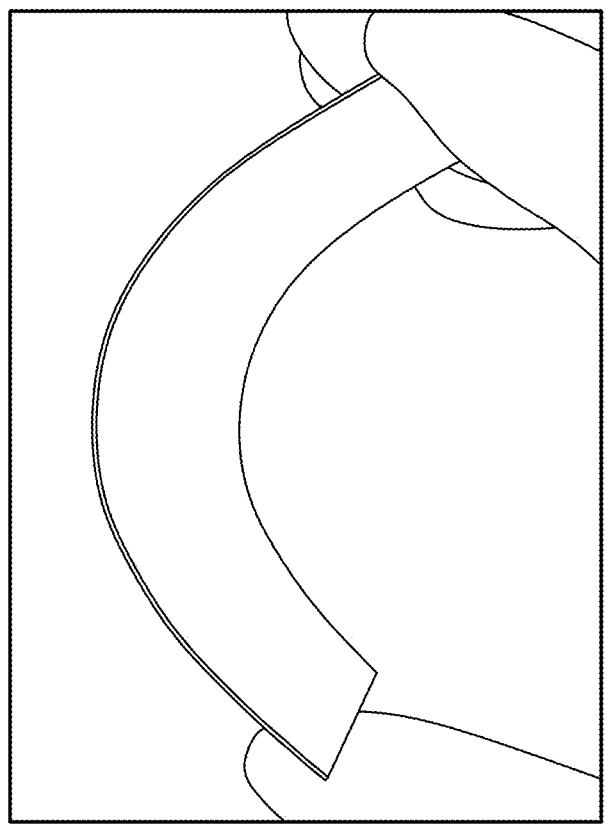
FIG. 13 is a photograph of a nanoporous selective sol-gel ceramic composite membrane, in accordance with an embodiment of the disclosure, under stress demonstrating flexibility and toughness of the nanoporous sol-gel ceramic composite membrane.

FIGS. 11 and 12 shows the results of the SAXS experiments. FIG. 12 is the scattering of the bare silica and cellulose macroporous supports as a reference. A broad peak in the low Q region of the PSS TEOS Silica membrane is seen. This membrane had a very different scattering pattern compared to the other three membranes which utilized the SS pre-coat as described earlier and in FIG. 2. From this it is evident that the pre-coat had some sort of significant effect on the structure of the sol-gel ceramic composite membranes. This was also noticed previously in the permeability results, as all the membranes that contained the SS pre-coat performed better than the membrane processed according to FIG. 1 that did not contain the pre-coat. Overall, the results presented here show the potential for sol-gel ceramic composite membranes processed via this method to serve as a replacement for Nafion® and other expensive membranes and filters.

Example 3

The following Example details the synthesis of porous and flexible silica-based membrane with various desired functional groups inside the pores. These membranes were processed either using the method described in FIG. 1 or FIG. 2. Both methods have the same first step, and differ only in the filling of the macroporous support. In step 1, a non-woven silica macroporous substrate (1 µm nominal pore size, 220 µm thickness, 70% porosity) was used in combination with a SIBS polymer edging (Kraton D1170). The SIBS was 150 μm thick and had a 5 mm overlap region with macroporous support and a 15 mm non-overlapping region in which the SIBS on either side of the support could seal to itself. SIBS was melted into the macroporous support using a heat press with pressure <100 kPa and temperatures between 300° F.-400° F. for times of 1-10 minutes. This ensured sufficient infiltration of the SIBS polymer into the macroporous support. Depending on the formulation, some membranes were tough enough to be used without the SIBS edging.

In using the method of FIG. 1, Ludox® particles were mixed with bifunctional $R^*_2$—Si—$(OR)_2$ or trifunctional organosilanes $R^*$—Si—$(OR)_3$. Typically, Ludox® SM-30 (30% wt. in water with 7 nm diameter) is used, but other types of Ludox® such as Ludox® HS-40 or Ludox® CL can be used as well depending on the application. The type of organosilane used depends on the application as well. For example, for membranes in flow batteries, alkyl groups were used to aid selectivity and sulfonic groups were used to aid proton conductivity The Ludox® suspension was mixed with the one or more types of organosilanes; the mixture varies between 50-95% Ludox® suspension and 5-50% organosilanes by volume. The pH was tuned to 2 using concentrated hydrochloric acid or sodium hydroxide, and the mixture was stirred vigorously at 60° C. until the mixture became a single phase solution. Initially, the mixture may not be miscible, but the release of ethanol and the hydroxyl groups of the organosilanes as a result of hydrolysis was sufficient to make a single-phase solution. The solution was aged 0-24 hours. The substrates from Step 1 were soaked for 30 seconds in the sol-gel solution. The sol-gel infiltrated substrates were then removed from the solution. The soaked macroporous support are left to dry on a Teflon plate at room temperature for 24 hours. The membranes resulting from this process is tough and flexible. The membrane does not crack upon maximum compression or bending to about 10 cm radius of curvature.

In using the method of FIG. 2, Ludox® suspension was tuned to pH 2 using concentrated hydrochloric acid. The substrates from Step 1 were soaked for 30 seconds in the sol-gel solution. The sol-gel infiltrated substrates were then removed from the solution. The soaked macroporous support are left to dry on a Teflon plate at room temperature for 24 hours. Another batch of sol was then prepared, where tetrafunctional silane molecular precursors such as tetraethyl orthosilicate (TEOS) or tetramethyl orthosilicate (TMOS) are mixed with organosilanes, alcohol (methanol, ethanol, isopropanol), water, and hydrochloric acid to tune the pH to 2. The amount of organosilane can range from 0-50% of the total silane species. The mole ratio of silane species to water and alcohol vary from 1:2-5:0-4. The components were vigorously stirred at 60° C. until there was sufficient hydrolysis of silane ethoxy groups and there is no phase separation. The sol was then aged for 0-24 hours. Finally, the previously filled macroporous support was immersed in the sol and left to dry on a Teflon plate for 24 hours.

Figure 14:
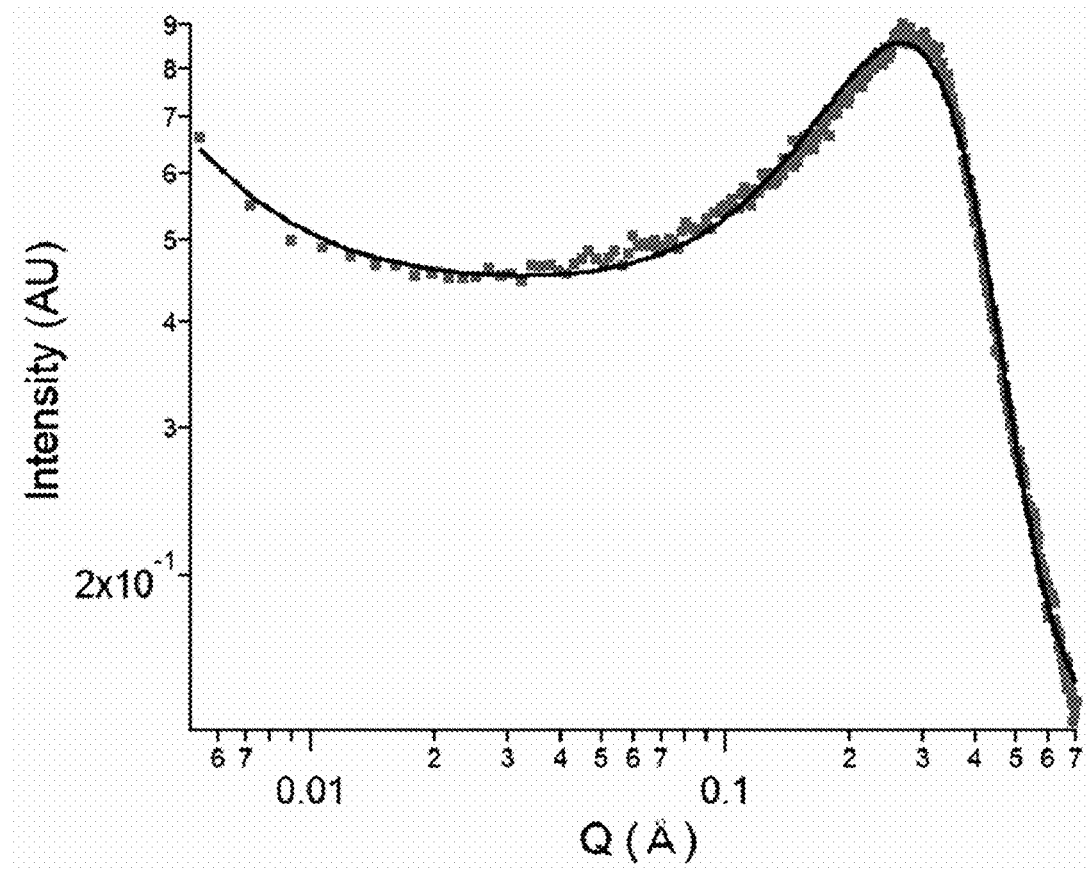
FIG. 14 is a SAXS profile of a nanoporous selective sol-gel ceramic composite membrane, in accordance with an embodiment of the disclosure, formed using 50/50 molar mixture of tetraethyl orthosilicate (TEOS) and hexyl triethoxysilane, along with its corresponding fit to a core-shell fractal aggregate model.

The functional groups on the organosilanes point outwards into the pores rather than getting embedded within the silica network. SAXS was performed on membranes formed from hexyl triethoxysilane and TEOS (FIG. 14), and its fit to the fractal core shell model, where the core is silica and the shell is a combination of the hydrocarbon and solvent. The fit in FIG. 14 shows a composite membrane with a core silica radius of 5.6 Å and a hexyl shell of 10.4 Å. The model indicates that even when R* are hydrophobic alkyl functional groups, these groups are pointing outwards rather than forming micelles. This structure of the sols in dispersion, where the R* groups are pointing outwards, is key to creating a membrane with tunable functional groups in the pores. Without adding TEOS or Ludox® into the mixture, however, the mixture did not gel even after an extended period of time because the organic groups and not able to hydrolyze and condense. The minimum amount of TEOS required to gel the sols depends on organosilane used, but is typically about 30% by mol.

Figure 15:
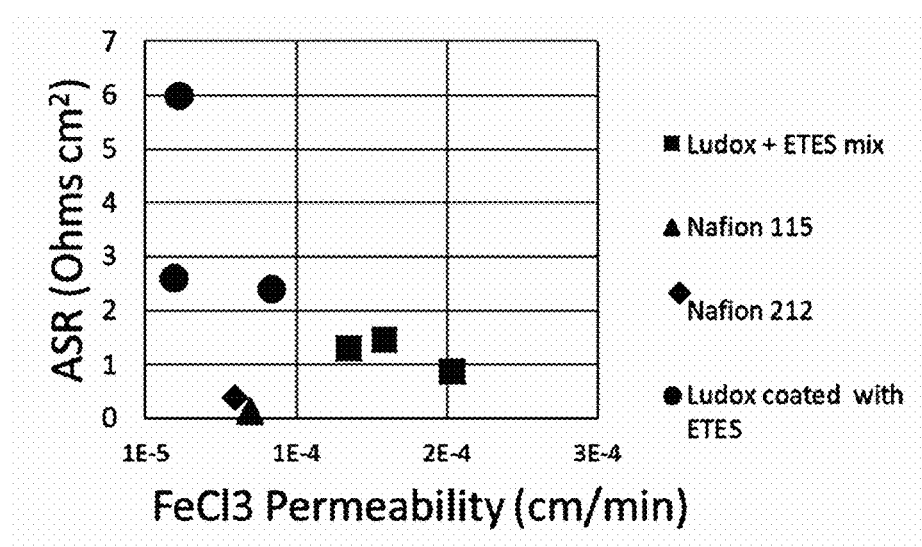
FIG. 15 is a plot of ASR and ferric chloride permeability of exemplary nanoporous selective sol-gel ceramic composite membrane synthesized using Ludox® and ethyltriethoxy silane.

ASR and permeability measurements (FIG. 15) were also performed as described in the methods section. The values are compared against Nafion® as the benchmark. The results are promising: both ASR and permeability of the silica based membranes are comparable or better than Nafion®.

Example 4

This Example illustrates preparation of a titania-based exemplary membrane. The chemicals used in titania membranes were titanium tetraisopropoxide (TTIP), TEOS, 3M hydrochloric acid, DI water, and pure ethanol (EtOH). 97% TTIP and 99% TEOS were obtained from Sigma-Aldrich Corporation, and pure ethanol 200 proof was from Decon Laboratories, Inc. Titanium dioxide was prepared by hydrolyzing TTIP with small amount of water in ethanol, and the pH needed to be adjusted by hydrochloric acid to prevent $TiO_2$ from precipitating. Partially hydrolyzed products are soluble in ethanol and form polymeric chains through the condensation of oxygen bridges. The equations are shown below:

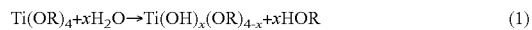

$$Ti(OR)_4 + xH_2O \rightarrow Ti(OH)_x(OR)_{4-x} + xHOR \qquad (1)$$

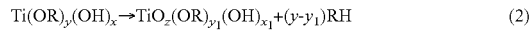

$$Ti(OR)_y(OH)_x \rightarrow TiO_z(OR)_{y_1}(OH)_{x_1} + (y-y_1)RH \qquad (2)$$

where $x<4$, $x_1<x$, $y_1<y$, $z=[4-(x_1+y_1)]/2$, and z is the number of oxygen bridges formed per titanium atom.

The membranes were prepared using the method described in FIG. 1. In this case, the optional method (2a) in the description of FIG. 1 was utilized where the sol-gel coating and drying step take place before adding the polymer edging. For Step 1, chemicals were mixed in the order of ethanol, HCl, TTIP, and water or TEOS to prepare the sol-gel solution. The following $H_2O$:TTIP:EtOH mass ratio of 1:29:18, 1:24:23, 1:14:32 were utilized. Solution could also be prepared with TEOS:TTIP:EtOH mass ratio of 1:21:26, 1:17:26, 1:10:26. Glass fiber paper (1 μm nominal pore size and 330 μm thickness) was coated by dipping the paper in the solution for about two minutes. The paper was coated three times. The interval between coatings was about ten minutes so that the surface was not visibly wet. For Step 2, the coated paper naturally dried out in fume hood for about 24 hours after final coating. The membranes were sent to F6030C furnace from Thermo Scientific for sintering. The furnace heated up to 50° C. below the target temperature at the speed of 5° C./min, and then the temperature increased to the target temperature at the speed of 1° C./min. The membranes were sintered at the target temperature (250° C., 350° C., & 450° C.) for 2 hours and then cooled down to room temperature. For Step 3, a SIBS polymer edge (Kraton D1170) was added to the membranes by melting the polymer into the coated paper using a heat press with temperature about 325° F. and time for about 2 minutes. The SIBIS polymer extended beyond the edge of the membranes by about 15 mm, and they had an overlap area about 5 mm.

Figure 16:
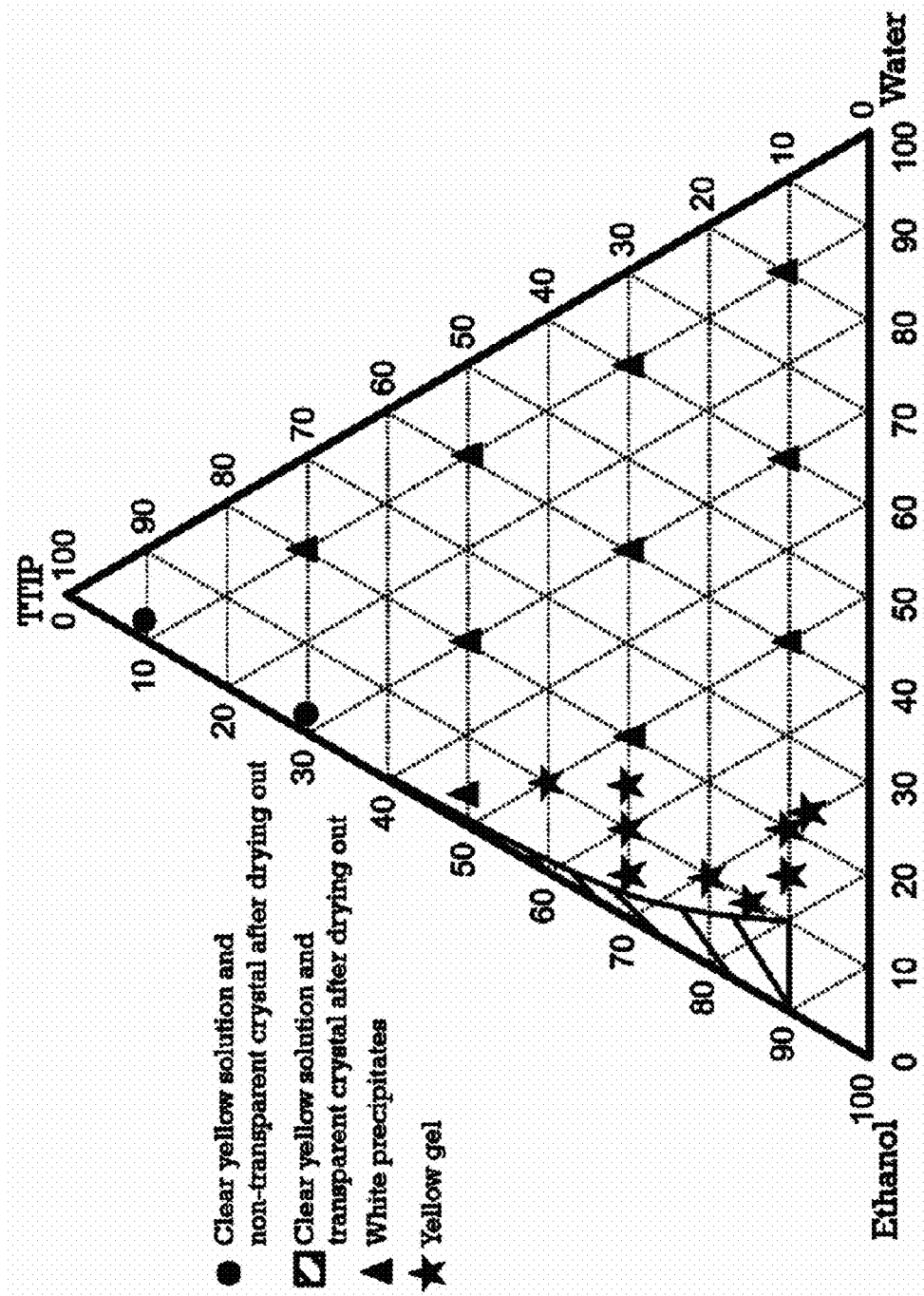
FIG. 16 is a phase diagram of tetraisopropoxide (TTIP), ethanol, and water.

In order to find appropriate amount of chemicals used in the reactions, a phase diagram of TTIP, ethanol, and water was explored (FIG. 16). The phase diagram is based on weight percent. The weight percent of hydrochloric acid was fixed to 0.022%, and the weight percent of other chemicals was changed. FIG. 14 shows this phase diagram. TTIP would precipitate with excess amount of water. Clear yellow solution was obtained after the reactions with little amount of water (less than 10%). After the samples dried out, the samples with less TTIP became transparent yellow crystals, and the samples with more TTIP became non-transparent yellow crystals. The samples were found to form yellow gel immediately with 10%-20% of water and with relative small amount of TTIP. The shaded area in the phase diagram is the region where yellow transparent crystals formed after drying out. The transparent yellow color shows that $TiO_2$ nanomaterial might be obtained. Thus, the shaded area would be focused for membranes coating.

Figure 17:
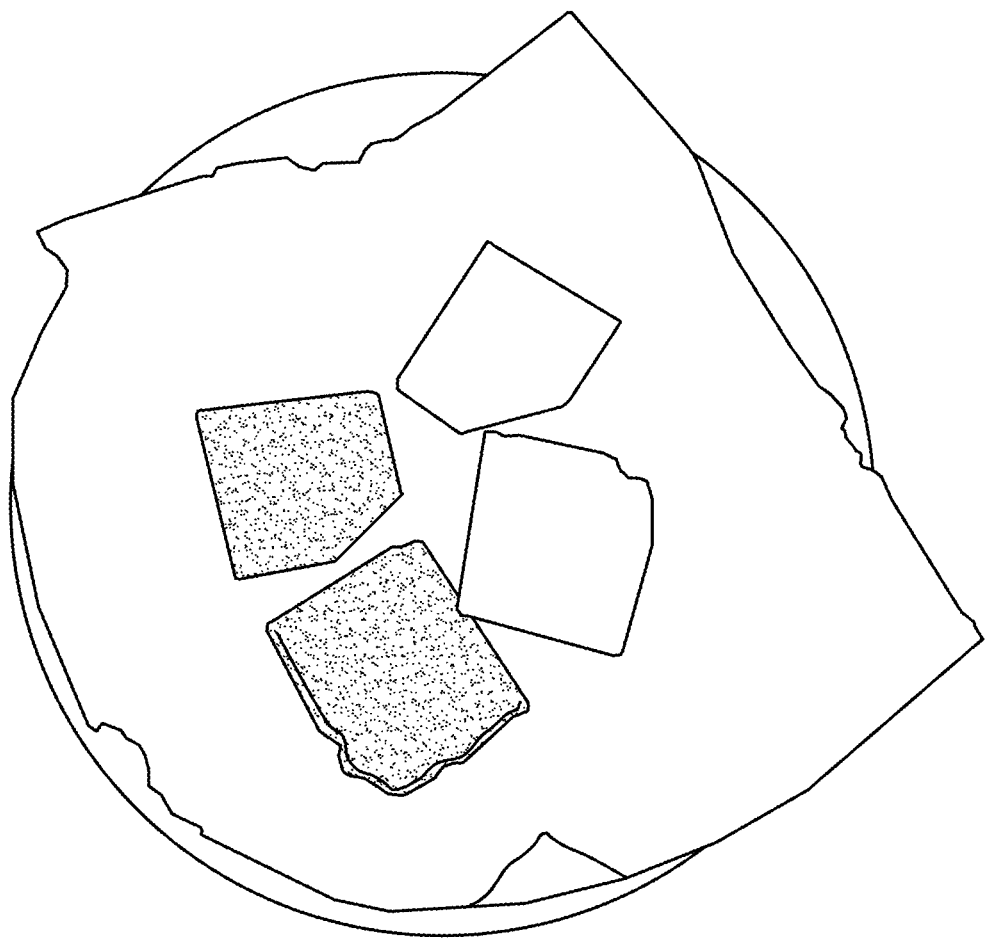
FIG. 17 is a photograph of $FeCl_3$ and $CrCl_3$ solution passed through membranes, in accordance with embodiments of the disclosure, and solution color showed on tissue paper.

Finished membranes were tested by dropping several drops (about 12 μL per drop) of 1M $FeCl_3$ or 1M $CrCl_3$ on the membranes. The membranes then were pressed to tissue paper to check whether metal ions passed through. FIG. 17 shows the membranes after this test. Coated paper can prevent several drops of solution from passing through, and the tissue paper would keep clean. When the membranes failed, the color of the test solution would show on the tissue paper. When test solution dropped on empty substrates, the solution directly penetrated, and the color showed on the tissue paper. Generally, without sintering, the membranes coated with larger amount of TTIP would prevent more drops of solution from penetrating. Thus, the membranes coated with higher concentration of TTIP might have worse permeability.

Table 1 compares SAXS results and drop test results among different membranes. Generally, the sintered membranes show larger pore radius and lower void fraction than non-sintered membranes. Compact structure might form after sintering, and shrinkage might happen to cause larger pore size. The drop test results would not change a lot after sintering. The membranes coated with water show worse drop test results and largest pore radius. All fractal dimensions are close to 3, which suggests that the pores are organized in a spherically expanding fractal structure.

The membranes coated with the same composition were sintered at different temperatures, and Table 2 shows the properties of these membranes. As sintering temperature increases, the pore size increases while void fraction decreases. Denser structure might form at higher sintering temperature. The membranes turned to brown after they were heated at lower temperature, which might be caused by the burning of organic contaminants. Organic contaminants might evaporate at higher sintering temperature so that the membranes kept the white color. Table 3 shows the WAXS results of the membranes sintered at 450° C. with different compositions. The pore size increases as the composition of TTIP increases in solution. However, void fraction does not show clear trend. The change of composition does not show critical effect on void fraction.

TABLE 1

Comparison of Exemplary Titania Membranes

| Composition (Weight %) | Sintered? | Void Fraction | Pore Radius (Å) | Fractal Dimension | Drop Test Results |
|---|---|---|---|---|---|
| TTIP:EtOH:H2O 60:38:2.1 | No | 0.063 | 7.6 | 3.0 | $3^{rd}$ drop passed |
|  | Yes | 0.033 | 48 | 3.0 | $2^{nd}$ drop passed |

TABLE 1-continued

Comparison of Exemplary Titania Membranes

| Composition (Weight %) | Sintered? | Void Fraction | Pore Radius (Å) | Fractal Dimension | Drop Test Results |
|---|---|---|---|---|---|
| TTIP:EtOH:H2O 50:48:2.1 | No | 0.040 | 6.0 | 3.0 | $2^{nd}$ drop passed |
|  | Yes | 0.024 | 59 | 3.1 | $2^{nd}$ drop passed |
| TTIP:EtOH:TEOS 50:48:1.9 | No | 0.027 | 6.4 | 3.0 | $4^{th}$ drop passed |
|  | Yes | 0.0093 | 14 | 2.7 | $3^{rd}$ drop passed |
| TTIP:EtOH:TEOS 44:54:2.1 | No | 0.041 | 6.7 | 3.0 | $3^{rd}$ drop passed |
|  | Yes | 0.011 | 12 | 2.8 | $3^{rd}$ drop passed |

TABLE 2

Properties of the Membranes Sintered at Different Temperatures

| Composition (Weight %) TTIP:EtOH:TEOS: 44:54:2.1 | Void Fraction | Pore Size (Å) | Fractal Dimension | Color |
|---|---|---|---|---|
| Without Sintering | 0.046 | 5.2 | 3.0 | White |
| Sintering at 250° C. | 0.027 | 9.6 | 3.0 | Brown |
| Sintering at 350° C. | 0.018 | 10 | 3.0 | Brown |
| Sintering at 450° C. | 0.012 | 14 | 2.9 | White |

TABLE 3

Properties of the Membranes with Different Compositions Sintered at 450° C.

| Composition (Weight %) TTIP:EtOH:TEOS | Void Fraction | Pore Size (Å) | Fractal Dimension | Color |
|---|---|---|---|---|
| 44:54:2.1 | 0.019 | 16 | 2.9 | White |
| 38:59:2.3 | 0.025 | 14 | 3.0 | White |
| 28:69:2.7 | 0.022 | 12 | 3.0 | White |

Example 5

In this Example, the sol-gel solution is comprised of volumetric ratios of a 17 wt % polystyrene sulfonate (PSS) in water solution and pure tetraethyl orthosilicate (TEOS). These membranes were processed using the method described in FIG. 1. For Step 1, a non-woven silica macroporous substrate (1 μm nominal pore size, 220 μm thickness, 70% porosity) was used in combination with a SIBS polymer edging (Kraton D1170). The SIBS was 150 μm thick and had a 5 mm overlap region with macroporous support and a 15 mm non-overlapping region in which the SIBS on either side of the support could seal to itself. SIBS was melted into the macroporous support using a heat press with pressure <100 kPa and temperatures between 300° F.-400° F. for times of 1-10 minutes. This ensured sufficient infiltration of the SIBS polymer into the macroporous support. For Step 2, the sol-gel solutions were prepared. The following PSS:TEOS ratios of 2:1, 1:1, 1:2, 1:3, 1:5, 1:7, 1:11, 1:18, 1:41 were utilized. Out of these ratios, the 1:2-1:11 range managed to achieve single phase sols within 5 hours and showed superior performance. Therefore, solutions of PSS and TEOS were prepared in PSS:TEOS ratios of 1:2, 1:3, 1:5, 1:7, 1:11, and stirred until the solution achieves a single phase. The polymer edged substrates from Step 1 were soaked for 30 seconds in the sol-gel solution. The sol-gel infiltrated substrates were then removed from the solution. An optional $3^{rd}$ Step (i.e., drying) was utilized to induce gelation (i.e., self-assembly) and then condensation. Drying was done for 24 hours at room temperature (~23° C.) on Teflon plates to prevent sticking of the membrane to the drying surface.

The membrane structure was characterized using Scanning Electron Microscopy (SEM). SEM was utilized to collect 200× and 2000× magnification images of both the top and the cross-section of the membranes. The images were used to scan for visible defects on top & cross-section and bridging cracks within the cross-section only. FIG. 16 shows these SEM images for the samples produced. As the amount of TEOS increases, the membranes look more densely filled from the top. However, cross-sectional images (close-up and zoomed out) shows that all membrane formulations are filled, which is necessary to prevent effective membrane operation.

SAXS data was also collected. SAXS profiles were collected of 10 minutes per sample using a transmission method and fit to a fractal aggregate model as described in EXAMPLE 4 above. The reproducibility of the membrane nanostructure was probed in a 10 cm×10 cm membrane using a 1:5 PSS:TEOS ratio using the same process described above. The membrane was divided into nine zones, each of which was subjected to SEM and SAXS procedures (FIG. 17). SEM images indicate no discernible variation across the membranes in terms of density, defects, or macrostructures. SAXS modeling was unable to detect any variations across the zones, and a characteristic pore radius of 4.5 Å, and minimum porosity of 2.6%.

Figure 18:
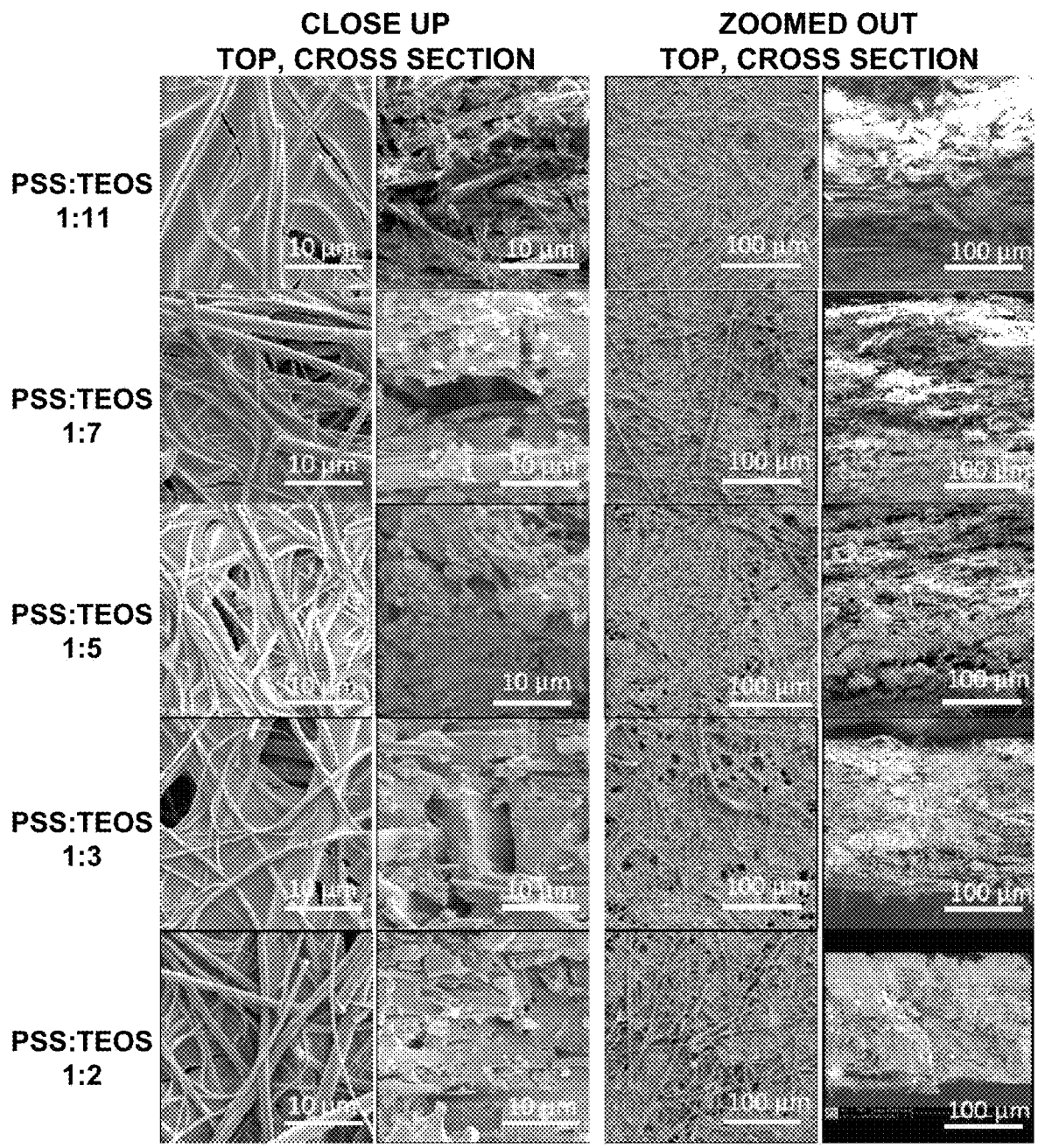
FIG. 18 is a series of scanning electron microscopy (SEM) images showing comparison of polystyrene sulfonate (PSS) TEOS single-phase molar ratios. The density of the cross-section at both magnifications increases in relation to increasing PSS ratio.
Figure 19A:
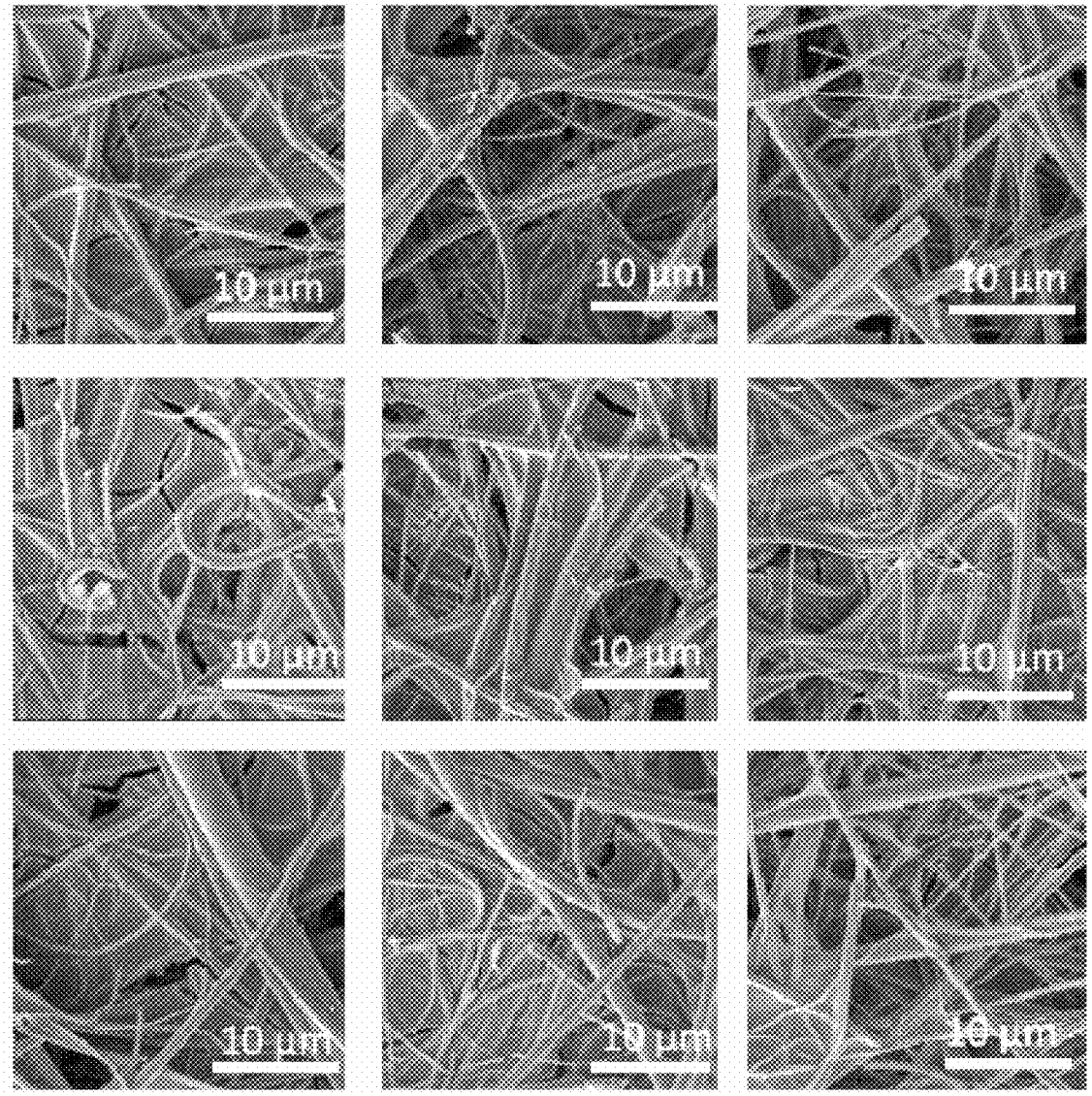
Figure 19B:
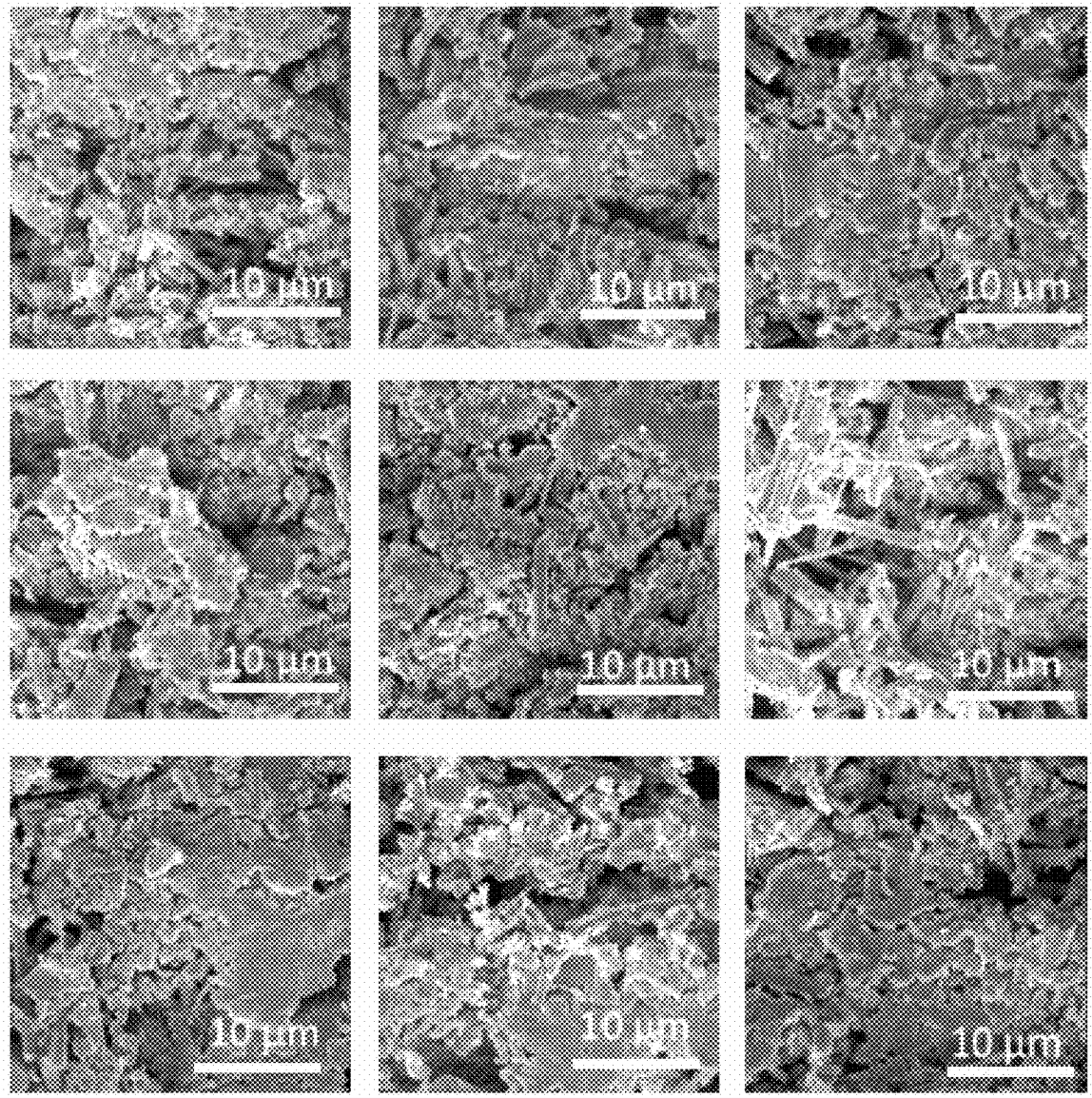
Figure 20:
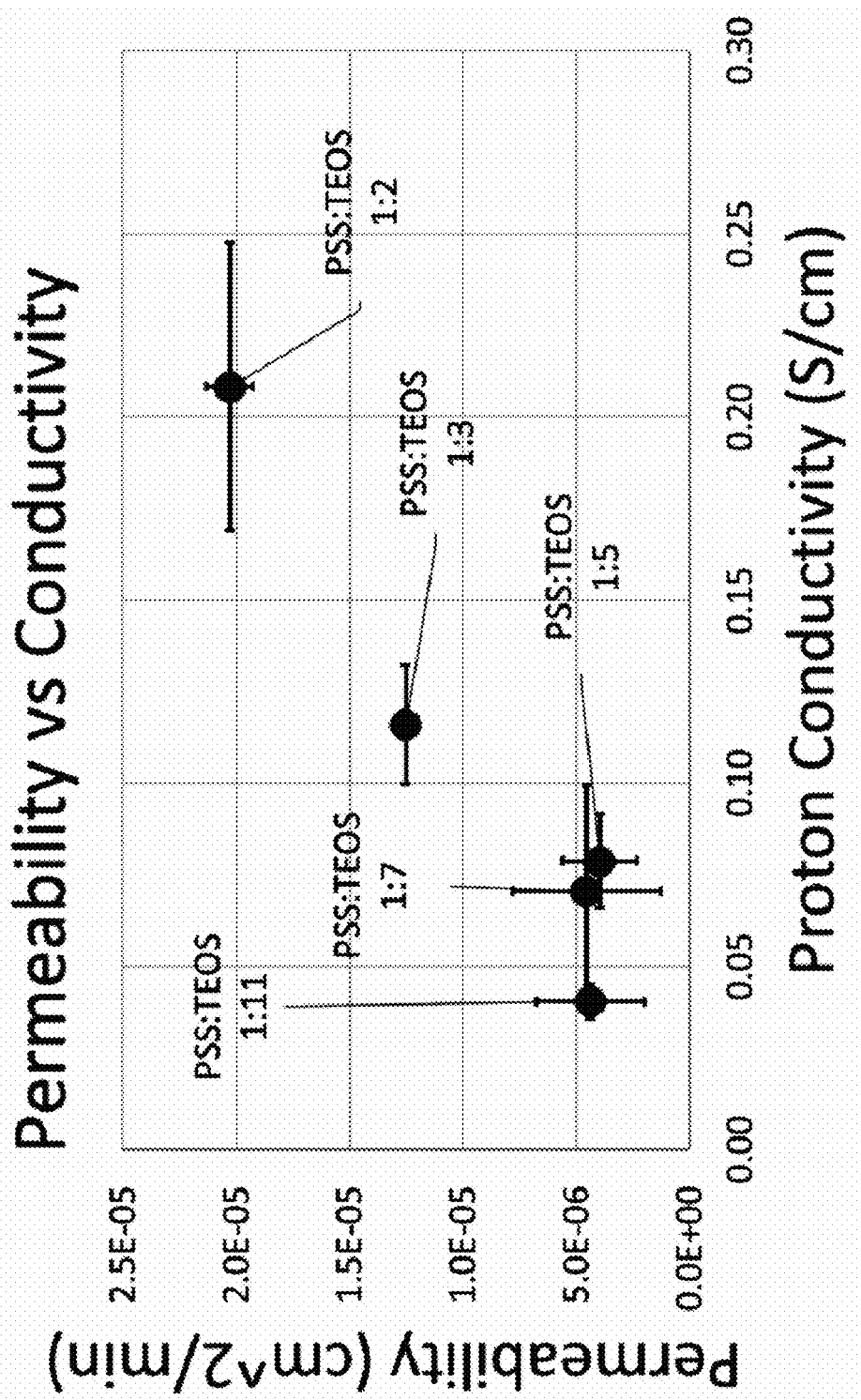
FIG. 20 shows a comparison of vanadium (IV) permeability and proton conductivity for PSS/TEO nanoporous selective sol-gel ceramic composite membranes, in accordance with embodiments of the disclosure, created at different ratios.
Figure 21:
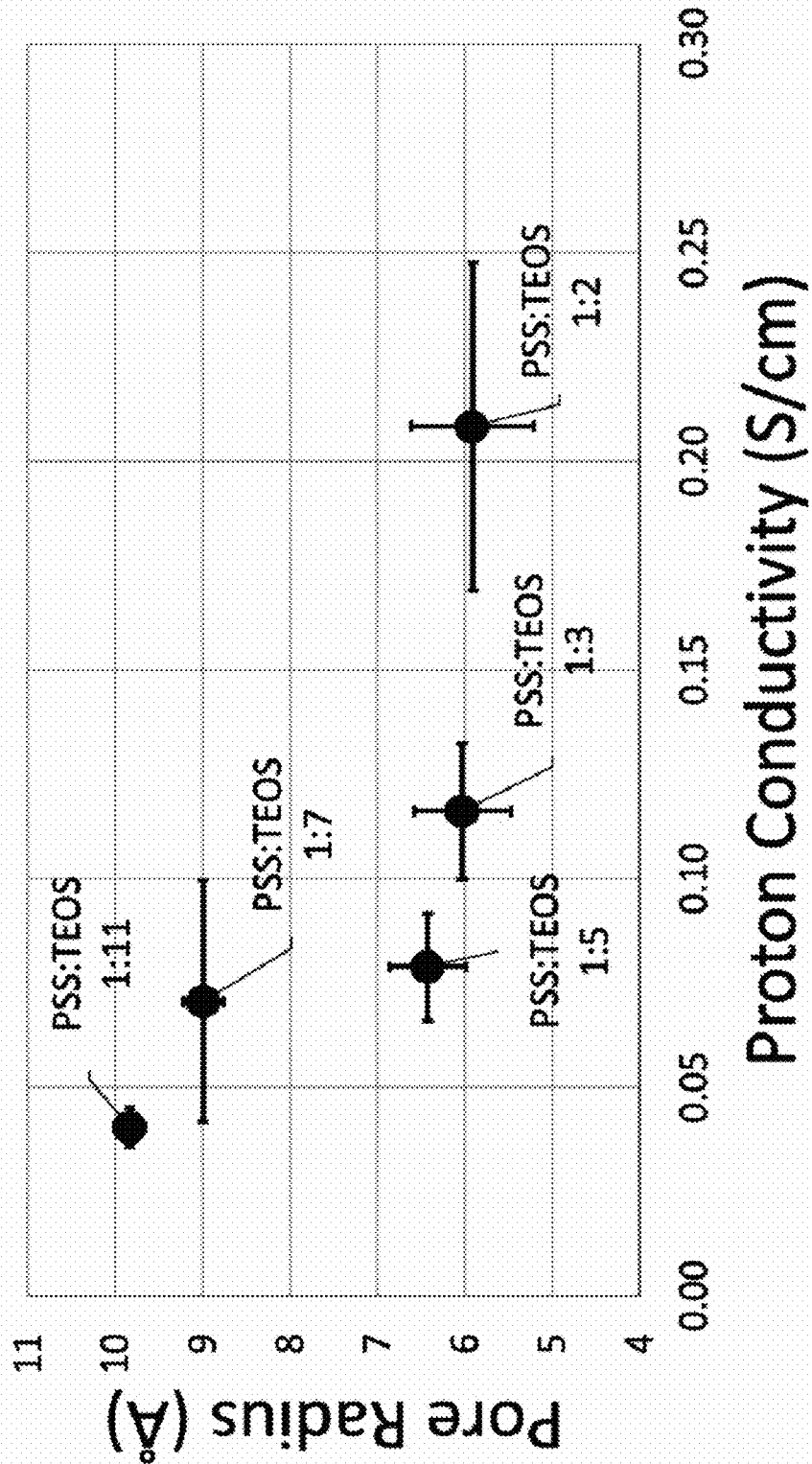
FIG. 21 shows comparison of pore radius and proton conductivity for PSS/TEO nanoporous selective sol-gel ceramic composite membranes, in accordance with embodiments of the present disclosure, created at different ratios.

Membranes were also characterized using ASR and permeability measurements as described in the methods section. This data is plotted in FIGS. 18 and 19. Ideally, a membrane would have low ion permeability and high proton conductivity, though a trade-off between the 2 is common. In this case, FIG. 18 shows this trade-off with a PSS:TEOS ratio of 1:7, 1:5 and 1:3 showing the best performance. FIG. 19 shows the relationship between membrane pore size (assessed by SAXS) and proton conductivity showing an increasing conductivity with decreasing pore size (and increasing PSS content).

Any approximate terms, such as "about," "approximately," and "substantially," indicate that the subject can be modified by plus or minus 5% and fall within the described embodiment.

While illustrative embodiments have been illustrated and described, it will be appreciated that various changes can be made therein without departing from the spirit and scope of the invention.

The embodiments of the invention in which an exclusive property or privilege is claimed are defined as follows:

1. A nanoporous ceramic membrane, comprising:
   a porous support having a plurality of support pores that are 10 nm or greater in diameter; and
   a nanoporous composite comprising a nanoporous ceramic filling at least a portion of the plurality of support pores;
   wherein the nanoporous ceramic has a spherical fractal nanoporous structure as determined by fitting small-angle scattering spectra of the nanoporous ceramic to a mathematical model.

2. The nanoporous ceramic membrane of claim 1, wherein the mathematical model is a fractal aggregate model.

3. The nanoporous ceramic membrane of claim 2, wherein a least squares regression fit of a de-smeared, 1-dimensional small-angle scattering spectra to the fractal aggregate model provides a $\chi^2/N_{pt}$ value of less than 10,
   wherein
   $\chi^2$ is a sum of an intensity difference between the fractal aggregate model and small-angle scattering spectra data, and
   $N_{pt}$ is a number of small-angle scattering data points over a model fitting range.

4. The nanoporous ceramic membrane of claim 2, wherein the fractal aggregate model is a measure of scattering intensity, I, as a function of a scattering vector, q, according to the equation:

$$I(q)=P(q)S(q)+\text{bck}$$

wherein
P(q) is a form factor of building blocks of the fractal aggregate model,
S(q) is an effective structure factor of the fractal aggregate model, and
bck is background scattering.

5. The nanoporous selective ceramic membrane of claim 4, wherein
the form factor, P(q), is a homogenous spherical form factor defined by the equation $$P(q) = \text{scale} \times V(\rho_{block} - \rho_{solvent})^2 F(qR_0)^2,$$

$$F(x) = \frac{3[\sin(x) - x\cos(x)]}{x^3},$$

$$V = \frac{4}{3}\pi R_0^3,$$

$$S(q) = 1 + \frac{D_f \Gamma(D_f - 1)}{[1 + 1/q\xi)^2]^{(D_f-1)/2}} \frac{\sin[(D_f - 1)\tan^{-1}(q\xi)]}{(qR_0)^{D_f}},$$

scale is a volume fraction of building blocks of the measured nanoporous ceramic,
$R_o$ is a radius of the building blocks,
$D_f$ is a fractal dimension,
$\xi$ is a correlation length,
$\rho_{solvent}$ is a scattering length density of a solvent, and
$\rho_{block}$ is a scattering length density of the building blocks.

6. The nanoporous ceramic membrane of claim 1, wherein the surfaces of the nanoporous ceramic are coated with a coating comprising an alkyl group.

7. The nanoporous selective ceramic membrane of claim 1, wherein the scattering intensity is fit to the mathematical model over a scattering vector, q, range of about 0.01 Å−1 to about 1 Å$^{-1}$.

8. The nanoporous ceramic membrane of claim 5, wherein scale corresponds to a membrane porosity when the small-angle scattering spectra is in intensity units of 1/cm and is less than 0.7.

9. The nanoporous selective ceramic membrane of claim 5, wherein the fractal dimension, $D_f$, is constrained to a range of about 1 to about 3.

10. The nanoporous ceramic membrane of claim 5, wherein
$\rho_{solvent}$ is defined by a scattering length density of a material of a solvent in the selective ceramic membrane, and
$\rho_{block}$ is defined by a scattering length density of a material of the building blocks.

11. The nanoporous selective ceramic membrane of claim 4, wherein bck is allowed to vary during fitting.

12. The nanoporous selective ceramic membrane of claim 1, wherein the small-angle scattering spectra includes small-angle scattering spectra selected from the group consisting of small-angle x-ray scattering spectra, small-angle neutron scattering spectra, small-angle light scattering spectra, and combinations thereof.

13. The nanoporous selective ceramic membrane of claim 1, wherein the mathematical model has a polydispersity ratio in a radius parameter.

14. The nanoporous ceramic membrane of claim 13, wherein the polydispersity ratio is constrained to less than 0.7.

15. The nanoporous ceramic membrane of claim 13, wherein the polydispersity ratio is from a log-normal distribution.

16. The nanoporous ceramic membrane of claim 1, wherein the small-angle scattering spectra of the nanoporous ceramic are measured after rinsing and drying the nanoporous ceramic to remove residual liquid and contaminants.

17. The nanoporous ceramic membrane of claim 1, wherein nanoporous ceramic comprises greater than 20 mole % oxygen in a range of about 20 mole % to about 80 mole % and greater than 10 mole % inorganic molcculci.

18. The nanoporous ceramic membrane of claim 17, wherein the nanoporous ceramic comprises a material selected from the group consisting of silica, alumina, titania, zirconia, germania, and combinations thereof.

19. The nanoporous ceramic membrane of claim 1, wherein the nanoporous ceramic has a porosity volume fraction in a range of about 0.01 to about 0.7.

\* \* \* \* \*

UNITED STATES PATENT AND TRADEMARK OFFICE
CERTIFICATE OF CORRECTION

PATENT NO. : 10,525,417 B2  
APPLICATION NO. : 16/366598  
DATED : January 7, 2020  
INVENTOR(S) : G. Newbloom et al.

Page 1 of 1

It is certified that error appears in the above-identified patent and that said Letters Patent is hereby corrected as shown below:

In the Claims

| Column | Line | |
| --- | --- | --- |
| 35 | 23 | Please change "wherein" to -- wherein the --. |
| 35 | 23&24 | Please change "comprises greater than 20 mole % oxygen" to -- comprises oxygen --. |
| 35 | 25 | Please change "% and greater than 10 mole % inorganic molcculci" to -- %. --. |

Signed and Sealed this  
Thirtieth Day of March, 2021

Drew Hirshfeld  
*Performing the Functions and Duties of the*  
*Under Secretary of Commerce for Intellectual Property and*  
*Director of the United States Patent and Trademark Office*